United States Patent
Kraenzel et al.

(10) Patent No.: US 6,845,383 B1
(45) Date of Patent: Jan. 18, 2005

(54) SYSTEM AND METHOD FOR MANAGING CONCURRENT SCHEDULED OR ON-DEMAND REPLICATION OF SUBSCRIPTIONS

(75) Inventors: Carl J. Kraenzel, Boston, MA (US); John D. Immerman, Sudbury, MA (US); William A. Mills, Arlington, MA (US); Mark A. Nowacki, Wilmington, MA (US); Jeannie J. Lu, West Roxbury, MA (US)

(73) Assignee: International Business Machines Corporation, Armonk, NY (US)

( * ) Notice: Subject to any disclaimer, the term of this patent is extended or adjusted under 35 U.S.C. 154(b) by 270 days.

(21) Appl. No.: 09/596,783

(22) Filed: Jun. 19, 2000

(51) Int. Cl.[7] ............................................. G06F 17/30
(52) U.S. Cl. ................................ 707/200; 707/9; 707/8
(58) Field of Search ....................... 707/1–10, 100–205; 709/218

(56) References Cited

U.S. PATENT DOCUMENTS

| | | | |
|---|---|---|---|
| 6,256,670 B1 * | 7/2001 | Davies ........................ | 709/224 |
| 6,259,405 B1 * | 7/2001 | Stewart et al. ............... | 342/457 |
| 6,272,537 B1 * | 8/2001 | Kekic et al. ................. | 709/223 |
| 6,292,790 B1 * | 9/2001 | Krahn et al. ................. | 700/79 |
| 6,295,482 B1 * | 9/2001 | Tognazzini .................. | 700/231 |
| 6,381,742 B2 * | 4/2002 | Forbes et al. ................ | 717/11 |
| 6,393,468 B1 * | 5/2002 | McGee ........................ | 707/513 |
| 6,421,714 B1 * | 7/2002 | Rai et al. .................... | 709/217 |
| 6,446,092 B1 * | 9/2002 | Sutter ......................... | 707/203 |
| 6,453,353 B1 * | 9/2002 | Win et al. ................... | 709/225 |

* cited by examiner

Primary Examiner—Greta Robinson
Assistant Examiner—Sathyanarayan Pannala
(74) Attorney, Agent, or Firm—Stephen T. Keohane; Shelley M. Beckstrand

(57) ABSTRACT

A workflow, enterprise, and mail-enabled application server and platform supports distributed computing and remote execution of web applications. Lotus Domino online services (DOLS) is used by a web site administrator to configure Internet Notes (iNotes) clients to auto download from server, thus providing iNotes clients with web access using HTTP with various browsers, and with local processing and replication. A local run time model comprises a hierarchy of models including object data store model, security model, indexing model, replication model, agent workflow model and mail model. DOLS provides a layered security model that allows flexibility for controlling access to all or part of an application. The highest level of security is managed through a database access control list (ACL). Further refinements within the security model provide access to specific documents, and their views, forms or folders, and include read access lists, write access lists, form access lists and readers and authors fields.

22 Claims, 24 Drawing Sheets

| | | | |
|---|---|---|---|
| 82 | LEVEL 0 | LOTUS iNOTES SYNC MGR NO DATA COMPRESSED DLLS | iNOTES COMPRESSED |
| 84 | LEVEL 1 | OEM'ABLE CD: NSF OF WEB SITE | iNOTES INSTALLER, NO DATA |
| 86 | LEVEL 2 | NOTES API PROGRAM NSF'S FOR iNOTES INSTALL | iNOTES INSTALLER, WITH CUSTOMER DATA |

FIG. 4

SCHEDULE TAB — 390

| SCHEDULE TYPE | FREQUENCY | LIMITATIONS | EXCEPTIONS |
|---|---|---|---|
| DAILY | REPEATING | STOP SYNC AT | DISABLE |
| WEEKLY | INTERNAL | | |
| MONTHLY | | | |
| DAY(S) OF WEEK | | | |
| DAY OF MONTH | | | |
| START TIME | | | |

- 392 / 394 / 396 / 398
- 430 DAILY, 431 WEEKLY, 432 MONTHLY, 433 DAY(S) OF WEEK, 434 DAY OF MONTH, 435 START TIME
- 436 INTERNAL, 437, 438 STOP SYNC AT, 439 DISABLE

FIG. 19

RULES TAB — 400

| FILE RULES | SYNC OPTIONS: DATE FILTERING | SYNC OPTIONS: HALT CONDITONS | SYNC OPTIONS: OPTIONAL ACTIONS |
|---|---|---|---|
| REQUIRED FILES TO REPLICATE | NUMBER OF DAYS LIMIT | DATABASE SIZE LIMIT | NOTIFY ON SYNC COMPLETION |
| OPTIONAL FILES TO REPLICATE | | SUBSCRIPTION SIZE LIMIT | ROUTE MAIL ON CLIENT SHUTDOWN |
| AUTO REPLICATE NEW DBs | | | REPLICATE ON CLIENT SHUTDOWN |

- 402 / 404 / 406 / 408
- 440 REQUIRED FILES, 441 OPTIONAL FILES, 442 AUTO REPLICATE
- 443, 444 NUMBER OF DAYS LIMIT
- 445 DATABASE SIZE LIMIT, 447 SUBSCRIPTION SIZE LIMIT
- 446 NOTIFY ON SYNC COMPLETION, 448 REPLICATE ON CLIENT SHUTDOWN

FIG. 20

SYSTEM AND METHOD FOR MANAGING CONCURRENT SCHEDULED OR ON-DEMAND REPLICATION OF SUBSCRIPTIONS

CROSS REFERENCES TO RELATED APPLICATIONS

The following U.S. patent applications filed concurrently herewith are assigned to the same assignee hereof, contain subject matter related, in certain respect, to the subject matter of the present application and are incorporated herein by reference:

U.S. patent application Ser. No. 09/596,283 filed 19 Jun. 2000 for "System and Method for Providing a Distributable Runtime";

U.S. patent application Ser. No. 09/596,282 filed 19 Jun. 2000 for "System and Method for Downloading Security Context Elements Governing Execution of Downloadable and Distributable Agents";

U.S. patent application Ser. No. 09/596,963 filed 19 Jun. 2000 for "System and Method for Selective Replication of Databases Within a Workflow, Enterprise, and Mail-Enabled Web Application Server and Platform";

U.S. patent application Ser. No. 09/597,997 filed 19 Jun. 2000 for "System and Method For Providing a Distributable Runtime That Deploys Web Applications and Services From a Workflow, Enterprise, and Mail-Enabled Web Application Server and Platform";

U.S. patent application Ser. No. 09/596,745 filed 19 Jun. 2000 for "A System and Method for a Web Based Trust Model Governing Delivery of Services and Programs"; and U.S. patent application Ser. No. 09/596,845 filed 16 Jun. 2000 for "A System and Method for Developing and Administering Web Applications and Services From a Workflow, Enterprise, and Mail-Enabled Web Application Server and Platform.

BACKGROUND OF THE INVENTION

1. Technical Field of the Invention

This invention pertains to a workflow, enterprise, and mail-enabled web application enhanced for distributed computing and remote execution.

2. Background Art

Lotus Notes (TM) is a workflow enterprise and mail enabled application server and platform.

The Lotus Development Corporation Domino (TM) server is an enhancement to Notes to add web capabilities. Thus, Domino is a workflow enterprise and mail enabled web application server and platform. There is a need in the art to enhance the Domino server and platform to allow distributed computing and remote execution of Domino web applications.

The Lotus Development Corporation QuickPlace (TM) server is an enhancement to Domino. It is a workflow, enterprise and mail-enabled web application server and environment for rapid creation of collaborative user communities. There is a need in the art to enhance this server and platform to allow distributed computing and remote execution of QuickPlace applications.

The Microsoft Exchange (TM) server is a mail enabled application server and platform. This does not support workflow, nor scale easily to an enterprise level. Novel's GroupWise (TM) server is a workflow enabled enterprise server and platform. This does not support mail, nor scale easily to an enterprise level. There is a need in the art for a mail and workflow web application server and environment which supports mail and scales easily and well to the enterprise level, which requires that all software elements need to scale to very large applications with respect to performance, loading, and administration tools.

Heretofore, replication of databases has been provided one at a time, or serially through a list of a plurality of databases. This may be optimum when all of the databases of interest are being replicated from a single server, or if there is a single CPU machine on the client and on the server. However, such may not provide optimum performance when it is desired to replicate to two data bases on the client machine, each from a different server. In this latter case, the performance limitation may not be the CPUs of the machines, but the bandwidth of the connection to the network.

Heretofore in the art, when replicating to subscriptions containing different data, data could be contaminated.

There is a need in the art to provide for unattended concurrent replication to a client machine of a plurality of subscriptions.

There is a need in the art to provide for replication to a single client of a plurality of subscriptions of different users having databases in common.

In the QuickPlace server there exists a mechanism by which Notes ID's are auto-generated on the server and shipped down across the communication link to a client during the client set-up time. There was one and only one way to get the Notes ID that is necessary for use during replication processes.

Additionally, in this prior art approach, the ID that is generated is strongly tied to the application, in that the ID includes the application identifier. Such an ID would generally not be desirable for use in another application setting.

In general, however, when adding a new application to an existing infrastructure with ID's deployed, it is desirable to reuse those ID's.

Notes infrastructures currently have two ways of managing deployment of user ID's. In accordance with the first, an ID is generated and provided to the user in a manually secure manner, such as by a floppy disk. The ID thus provided is then used during the installation of the new client application, such as a Notes client. The floppy disk can then be carried about as a private ticket, and used at various client machine locations when desired to access the server site. In accordance with the second, the ID is generated and attached as an ID to a person record. It is there available to be detached to a file system when a client needs it.

It is an object of the invention to provide a system and method for enhancing a workflow, enterprise, and mail-enabled application server and platform to support distributed computing and remote execution of web applications.

It is a further object of the invention to provide a system and method for enhancing a workflow, enterprise and mail-enabled web application to allow distributed computing and remote execution of collaborative user community creation.

It is an object of the invention to provide an improved system and method for issuing user identifiers (IDs).

It is an object of the invention to provide a system and method for issuing user IDs which enables an administrator selectively to generate an ID, reuse a previously issued ID, or prompt a user for an ID.

It is an object of the invention to provide a system and method for a plurality of ID distribution models, including those where a user ID is available in a name and address book or on a users file system.

It is an object of the invention to provide a system and method for selective generation or lookup of ID's for a new infrastructure based upon the existence or non-existence of an infrastructure with appropriate ID's already deployed.

SUMMARY OF THE INVENTION

In accordance with the invention, a system and method is provided for managing concurrent scheduled or on-demand replication of subscriptions for different user credentials within a workflow, enterprise and mail-enabled web application server and platform. User passwords are stored in a database, and a plurality of subscriptions are provided, each identified by a subscription user credential including password, user name and authenticatable electronic certificates. A service manager is provided for executing concurrent replication of a plurality of the subscriptions on schedule or demand for which a password corresponding to subscription credential has been provided by a user or found in the database.

In accordance with a further aspect of the invention, there is provided a system and method for issuing user identifiers for subscriptions in a workflow, enterprise and mail-enabled application server and platform. A database of security domains is provided and responsive to that database, user identifiers are distributed selectively based upon security domain through auto generation, directory lookup or user prompt.

In accordance with a further aspect of the invention, there is provided a computer program product configured to be operable for managing concurrent scheduled or on-demand replication of subscriptions for different user credentials within a workflow, enterprise and mail-enabled web application server and platform.

In accordance with a further aspect of the invention, there is provided a computer program product configured to be operable for issuing user identifiers for subscriptions in a workflow, enterprise and mail-enabled application server and platform.

Other features and advantages of this invention will become apparent from the following detailed description of the presently preferred embodiment of the invention, taken in conjunction with the accompanying drawings.

BRIEF DESCRIPTION OF THE DRAWINGS

FIG. 4 is a diagram illustrating three levels of support for CD distribution of iNotes.

FIG. 19 is a diagram illustrating the schedule page of an offline subscription configuration profile document.

FIG. 20 is a diagram illustrating the rules page of an offline subscription configuration profile document.

BEST MODE FOR CARRYING OUT THE INVENTION

Outline

PART I. Models
  A. On Line Services Model
  B. Local Run Time Model
  C. Client Local Replica Model
PART II. System Architecture
  A. Overview
  B. Protocol Interfaces
  B.1 Protocol Interface 307 and Download Control 146
  B.2 Protocol Interface 308
  B.3 Protocol Interface 313
  B.4 Protocol Interface 317
  C. Server Segment
  C.1 Server 104/HTTP 106
  C.2 DSAPI ID Extensions 108
  C.3 ID Policy DB 114
  C.4 ID Repository DB 111
  C.5 Compressed File Sets 118–128
  C.6 Design Inclusions DB 116
  C.7 Offline Configuration Form 130
  C.8 JScript Files and Web Sync Control 132–134
  C.9 Notes Template Files (.ntf) 157, 115, 159
  C.10 Subscription 136
  C.11 Subscription Main Database 140

C.12 Offline Configuration Document 138
C.13 Required and Optional Databases 142–144
D. Client Segment
D.1 Subscription
D.2 Service Manager UI
D.2.1 Agent Services 226
D.3 Subscription Properties Box
D.4 Download Page 230
D.4.1 Configuration Document 232
D.4.2 Basics Page
D.4.3 Services Page
D.4.4 Schedule Page
D.4.5 Rules Page
D.4.6 Offline Security Policy Form
D.5 Application Page 238 (User Experience)
D.5.1 Web Control 241
D.6 Other Components 246–258
E. Access Control List
PART III. System Operation
A. Designer Processes
A.1 Create Offline Subscription Configuration Document
A.2 Create Download Page
A.3 Create Offline Security Policy Document
A.4 Use Domino Off-Line Services Sample Template
A.5 Create Custom Filesets
A.6 Use Customize Subform
A.7 Set Up Multiple Database Applications
B. Administrator Processes
B.1 Keep Track of Offline Users
B.2 Set Up Selective Replication
B.3 Set Up Agents for Offline Use
B.4 Auto Issue with ID Reuse
B.5 Control Access to Database: ACL & SSL
C. Download Processes
C.1 Security Context
C.2 Download File Sets
C.3 Set Up File Sets
C.4 Populate Client Subscription
D. CD Distribution
E. End User Processes
E.1 Overview
E.2 Service Manager Tasks
E.2.a HTTP
E.2.b Application Page
E.2.c Synchronize/Concurrent Replication
E.2.d Index
E.2.e Agent
E.2.f Custom

Part I. Models

I.A. On Line Services Model (FIG. 1)

Lotus Notes (TM) is a workflow, enterprise, and mail-enabled application server and platform.

Figure 1:
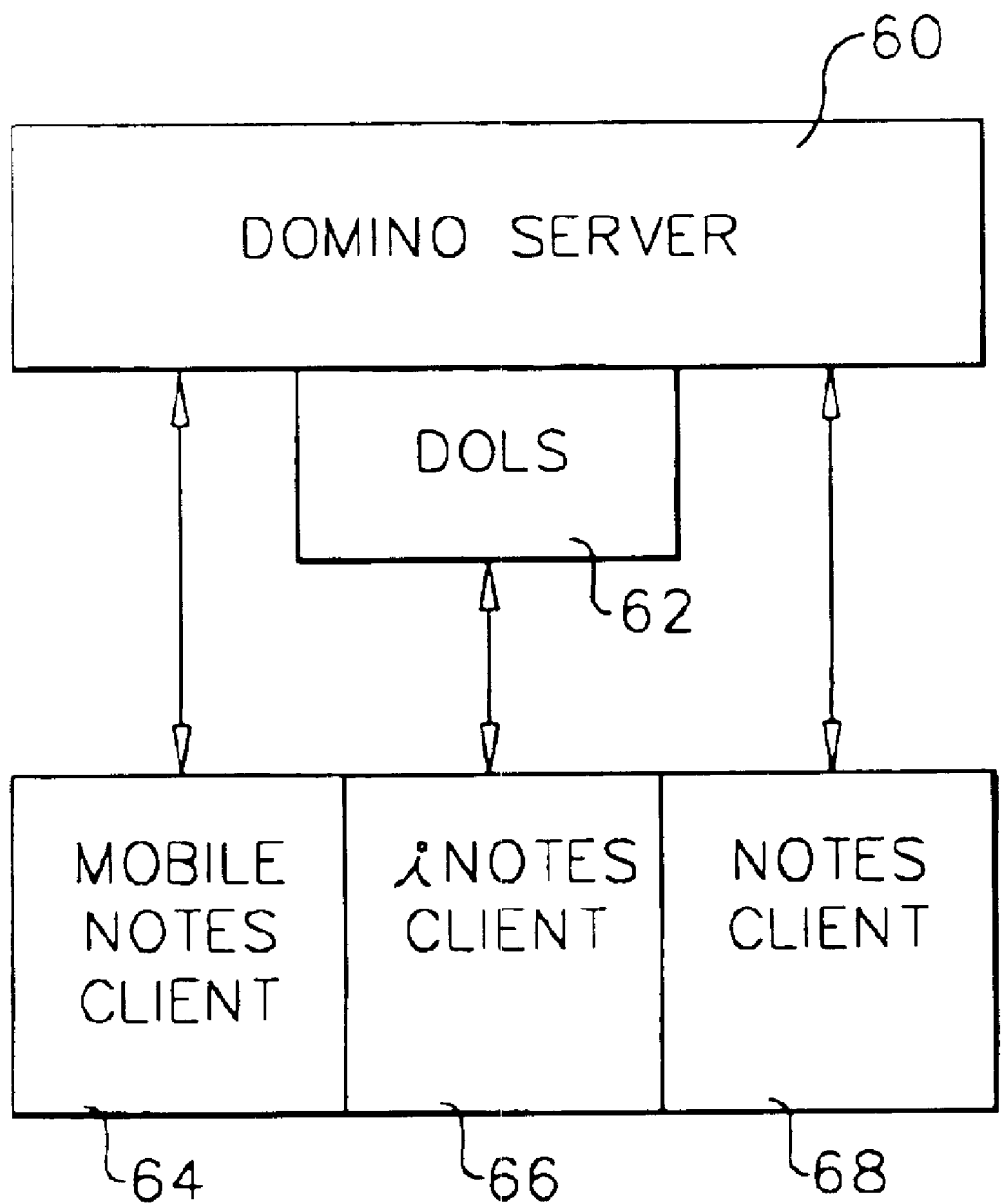
FIG. 1 is a high level system diagram illustrating the relationship of the DOLS facility of the preferred embodiment invention within context of related server and client applications.

Referring to FIG. 1, Domino (TM) server 60 is an enhancement to Notes to add web capabilities. Thus, Domino server 60 is a workflow enterprise and mail-enabled web application server and platform configured with respect to Notes in support of mobile Notes client 64 and Notes client 68. In the Lotus Notes file system, the Domino web server 60 is viewed as a super folder.

Lotus QuickPlace (TM) server (not shown) is also an enhancement to the Domino server. It is a workflow enterprise and mail-enabled web application server and environment for rapid creation of collaborative user communities. The QuickPlace server is described in copending U.S. patent application, Ser. No. 09/477,473 filed 4 Jan. 2000 for System and Method for Client Replication of Collaboration Space, and in several copending applications referenced therein.

Domino Online Services (DOLS) 62 provides an enhancement to the Domino server and platform 60 to allow distributed computing and remote execution by iNotes client 66 of Domino web applications and distributed computing and remote execution of the QuickPlace server applications.

Domino online services (DOLS) 62 is used by a web site administrator to configure Internet Notes (iNotes) clients to auto download from server 60, thus providing iNotes clients with web access using HTTP with various browsers, and with local processing and replication.

DOLS 62 provides a layered security model that allows flexibility for controlling access to all or part of an application. The highest level of security is managed through a database access control list (ACL). Further refinements within the security model provide access to specific documents, and their views, forms or folders, and include read access lists, write access lists, form access lists and readers and authors fields.

I.B. Local Run Time Model (FIG. 2)

Figure 2:
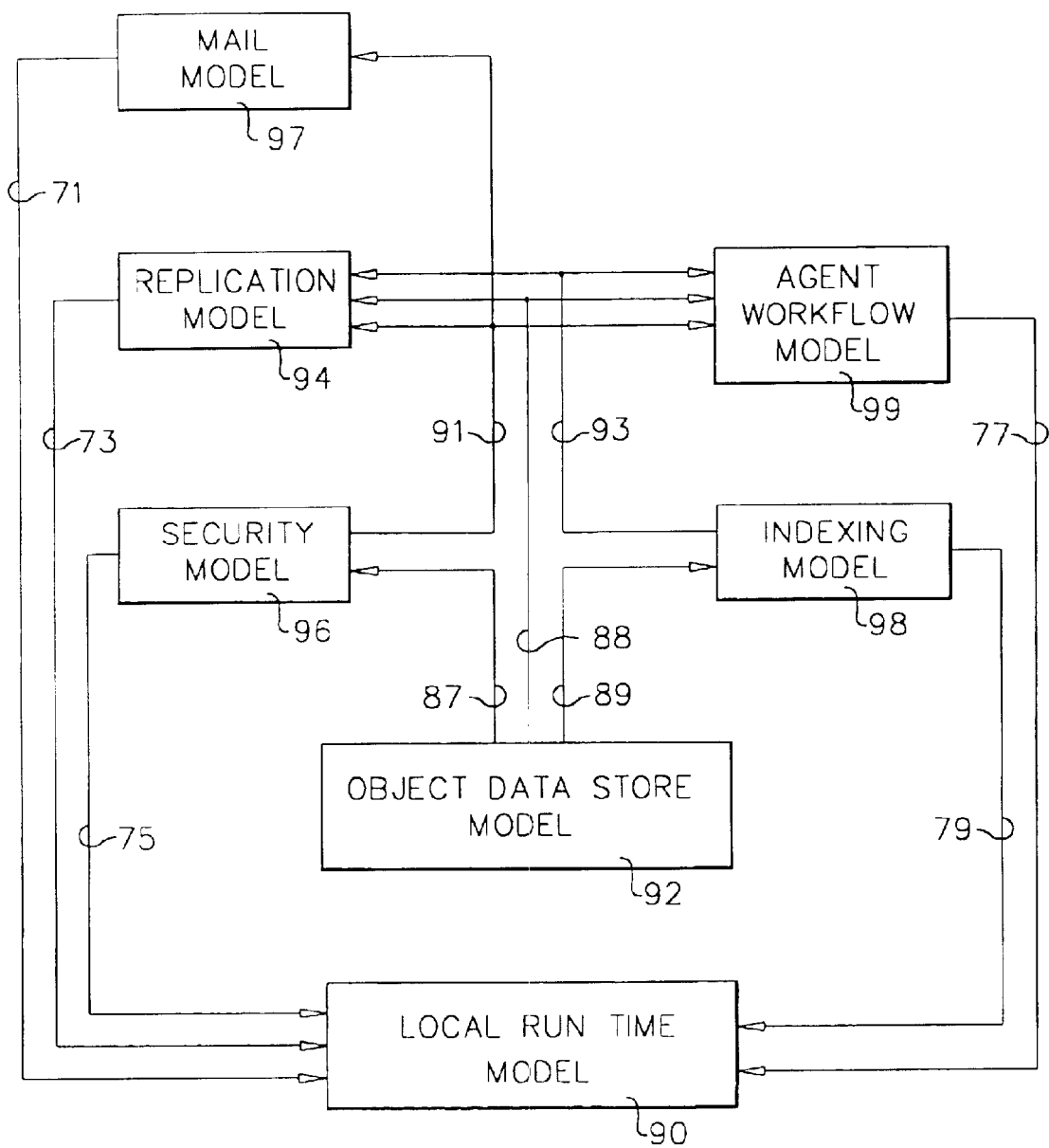
FIG. 2 is a diagram illustrating the objects unbundled to a local run time model in support of an API for client side execution of Notes.

Referring to FIG. 2, local run time model 90 provides an API object model allowing third party application access to the data, security, and logic models of an object-oriented database which retains a multi-level security model, replication model, and a tree-based indexing model that can be stored and updated. Such third party, or user written API programs may, in accordance with the preferred embodiment of the invention, be deployed for client side execution on top of the local run time model. Run times are variously referred to in the industry as lower level code in a many level or layered programming environment, and code deployed on top of a layer, such run time, contain instructions that are executed on behalf of the deployed code by the lower layer, or run time code.

Local run time model 90 comprises a hierarchy of models including object data store model 92, security model 96, indexing model 98, replication model 94, agent workflow model 99 and mail model 97. In the exemplary embodiment of FIG. 9, to be described hereafter, a local run time model 90 is represented, in part, by elements 208, 210, databases 212, 214, 216, service manager 218, and all of the objects in FIG. 9 except subscription 204, including subscription database 202 with ACL 203, and subscription user ID 206.

In the hierarchy of models of FIG. 2, the design of a parent model is a prerequisite to the design of a child model. The parent/child relationship is represented by lines 71, 73, 75, 77, 79, 87–89, 91 and 93 which point from each parent to its child. The base model of the hierarchy is object data store model 92.

In accordance with the preferred embodiment of the invention, object data store model 92 includes for each data element (such as a database) of the object data store model 92, an access control element (such as an access control list, or ACL) that specifies the level of access that users and servers have to the data element. As is represented by lines 87–89, object data store model 92 is a prerequisite model to security model 96, indexing model 98, replication model 94, and agent workflow model 99. In the exemplary embodiment of FIG. 9, object data store model 92 is represented, in part, by databases 212, 214, and 216 which are collections of .nsf and .nst files in directory 208, together with their respective access control lists 181–183.

Security model 96 is a collection of log in credentials. Security model 96 includes ACL protection of databases, and may also provide controls for access to documents. In the exemplary embodiment of FIG. 5, security model 96 is represented, in part, by ACLs 181–183, ID files 210 and, subsequent to first log-in to the server, subscription user ID 206. As represented by line 87, object data store model is a prerequisite to security model 87.

Indexing model 98 comprises indexes of two types. First, a hierarchical index which is utilized on all databases. The existence of such a hierarchical index is what distinguishes a database from an ordinary file. It organizes data inside of a file so that it exhibits database behavior. Second, a full text index, which is an optional index used in connection with a database with use content (such as, in the exemplary embodiment of FIG. 9, subscription 202) to allow fast location of text string sequences. Indexing model 98 refers to a search index which administrators and database managers may apply to databases and files in, for example, a Domino domain, and which allows the creation of views. Maintaining such an index requires creating a hierarchical and, optionally, a full-text index for each database replica, and periodically updating them to keep them synchronized with changes to the databases. As represented by line 89, objective data store model 92 is a prerequisite to indexing model 98.

Replication model 94 is a series of rules describing how to organize and synchronize databases. Model 94 refers to database replication, where replicated databases are identified by a replica ID and protected by an access control element. A replicated data base differs from a copy of a database. Although a copy may look the same, it does not carry the replica ID and cannot replicate with the original database. In the exemplary embodiment of FIG. 9, these rules are collected in synchronization task 220. As is represented by lines 88, 91, and 93, object data store model 92, security model 96, and indexing model 98 are prerequisites to replication model 94.

Lotus indexing and replication models are described in Lotus, Managing Domino Databases, Release 5, copyright 1985–1999, Lotus Development Corporation, Cambridge, Mass.

Agent workflow model 99 implements the execution of an agent. Agents can be contained in any or all databases. The rules by which agents trigger or otherwise execute are defined by an agent model. As is represented by lines 91, 93, and 88, object data store model 92, security model 96, and indexing model 98 are prerequisites to agent workflow model 99. In the exemplary embodiment of FIG. 9, agent component 226 implements the execution of an agent.

Mail model 97 is the rules for forwarding information from one object data store location to another (as distinguished from replication model 94, which synchronizes multiple copies of the same information). As is represented by line 91, security model 96 is prerequisite to mail model 97 in the sense that mail model 97 must provide for verification of the identity of users accessing mail model 97 with respect to a data object. In the exemplary embodiment of FIG. 9, local mail box 214, supported by subscription 202 and sync line 113, implements mail model 97.

Figure 5:
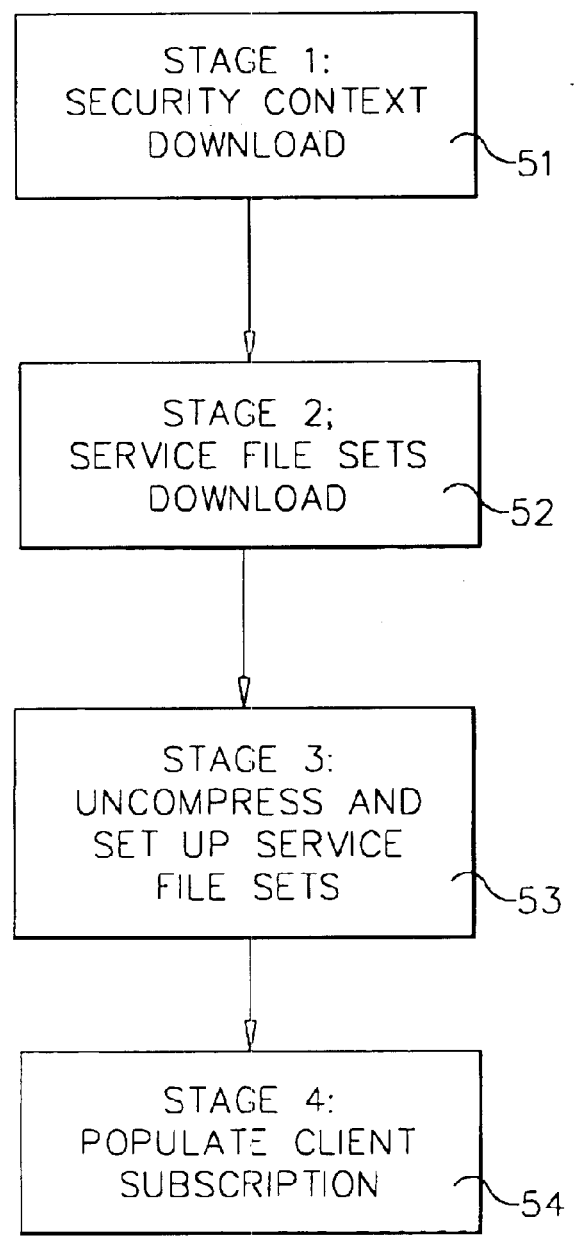
FIG. 5 is a flow diagram illustrating the four stages of client download.

I.C. Client Local Replica Model (FIGS. 3–5)

Figure 3:
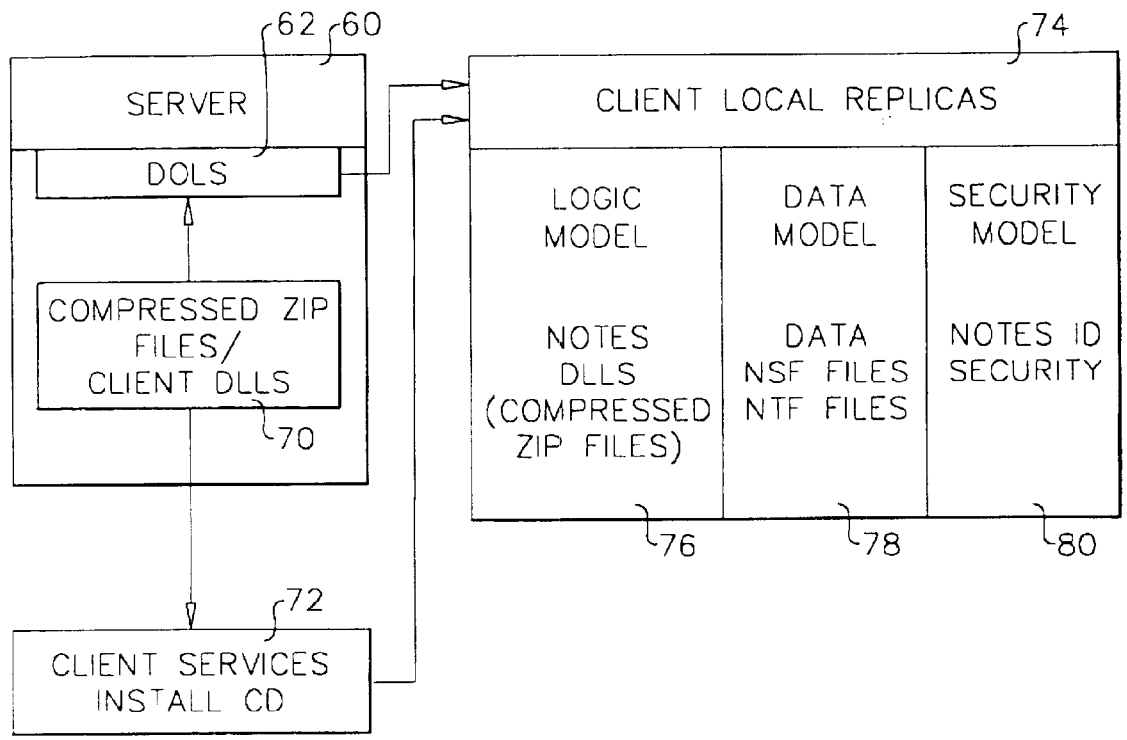
FIG. 3 is a high level system illustrating the logic model, data model, and security model of a preferred embodiment of the invention.

Referring to FIG. 3, in accordance with a preferred embodiment of the invention, DOLS 62 is installed on a Domino server 60. DOLS 62 provides the server 60 with compressed zip files 70, that contain client Notes program dynamic link library modules (DLLs). These DLLs don't get used on the server, but they are packed on the server for eventual installation 76 onto some client machine 74, along with the Web site information referred to as an iNotes client 74. The result is that the client 74 has a local replica of the Web site, including a replica 76 of DLLs 70, and .nsf and .ntf databases 78, including agents.

An .nsf database is a file that is the container for data, logic, and design elements in an application. If such a database is a designer template file that contains the structure for a database, its pages, forms and views, but not documents, then it is an .ntf database.

A file set contains many DLLs, which are program executable objects. Most programs that would be one large .exe file are in present practice broken into these smaller DLL units. Each DLL is, internally, executable code. A group includes one .exe file and many .dll files. In the context of the description of the present invention, reference to the DLLs refers to executable code that supports a service. In the exemplary embodiment of FIG. 7, service 126 and locale 128 refer to self extracting ZIP files, each self extracting file containing many compressed dynamic linked library (DLL) files. These DLLs are represented on server 100 by program directory <pdir> 104 and on client 200 by program directory <pdir> 204, which define the locations where uncompressed DLL files reside. There are also DLL files compressed into files referenced by directory specifications 126 and 128.

Agents are stand-alone programs that perform a specific task in one or more databases, and as databases are under access control library (ACL) security.

The function of DOLS 62 is to set up and maintain replication of the Notes DLL's 70 and 76; Program DLLs 70 is a large collection of compressed ZIP files.

Referring to FIG. 4, three levels 82, 84 and 86 of alternative distribution systems involving use of a client services install medium, such as a CD 72, are presented: level 0 (iNotes compressed) 82, level 1 (iNotes installer without data) 84, and level 2 (iNotes installer with data) 86. While in this embodiment a CD client services model is referenced, any equivalent, transportable medium may be used—such as a ZIP or JAZZ drive, or preload to the hard drive of a computer, and so forth.

Referring to FIG. 5, as will be more fully described hereafter, run time download comprises a four stage process, all of which are done communicating across a network. These are stage 1: security context download; stage 2: service file sets download; stage 3: uncompress and set up service file sets; and stage 4: populate client subscription, referred to respectively as steps 51–54. Client service install CD level 0 (iNotes compressed), however, installs the service file sets of stage 2, and run time processing only requires execution of stages 1, 3, and 4. Client services install CD level 1 provides for stages 1–3, and run time processing only requires run time, or network connection, for stage 4. Client services install CD level 2 also populates the client subscription, and no network connection is required to establish a client run time environment.

Part II. System Architecture Example

II.A. Overview

This invention provides an API for Notes for off-line operation. A preferred embodiment of this invention provides a web site with custom DLLs for delivery with iNotes. The iNotes programs are delivered to offline clients along with subscriptions. The preferred embodiment of this invention also provides server extensions (custom code) for download with iNotes. A subscription is, in accordance with an exemplary embodiment of the invention, a secured (that is, ACL protected) database or collection of databases containing off-line web applications with synchronization schedules and with which an authorized user may interact, either on-line or with an off-line instantiation.

This invention also provides web site development tools for use by administrators. A template file of forms and pages for copy and paste into a subscription database allows the downloaded page to look as described and to have correct download values and properties. Several subforms form a download page from the web, and specify the services to download and the replication parameters and configurations.

This invention also allows people to bundle copies of a database on a CD in compressed files, thus deploying inotes clients that never need to talk to servers. This CD installs a mini web site locally that has the look and feel, the security, data and program logic of a fully functional web site.

Figure 6:
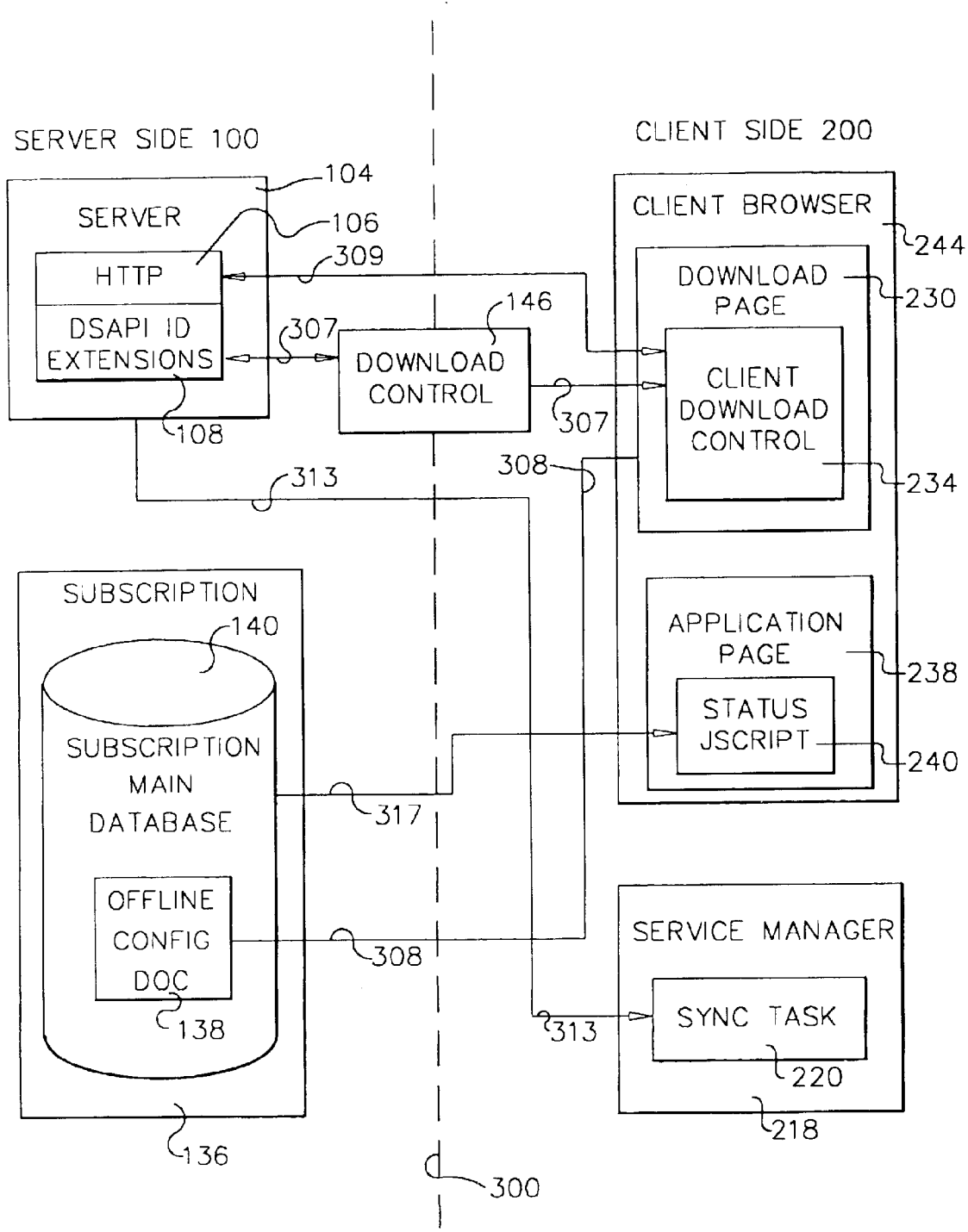
FIG. 6 illustrates protocol interfaces between server and client, with a download element shown on the interface boundary.
Figure 7:
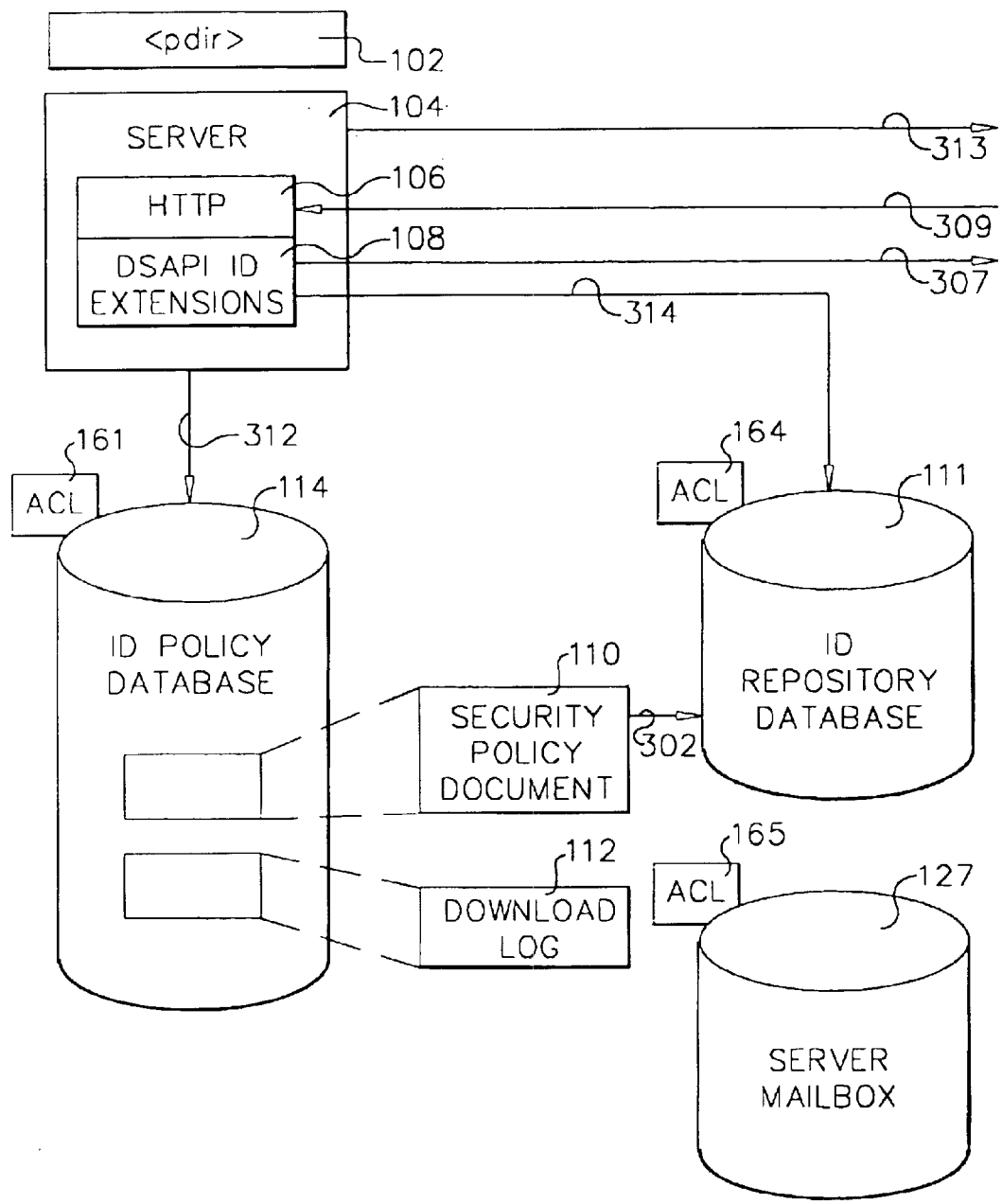
FIG. 7 and FIG. 8 illustrate the system architecture of the server of the preferred embodiment of the invention.
Figure 8:
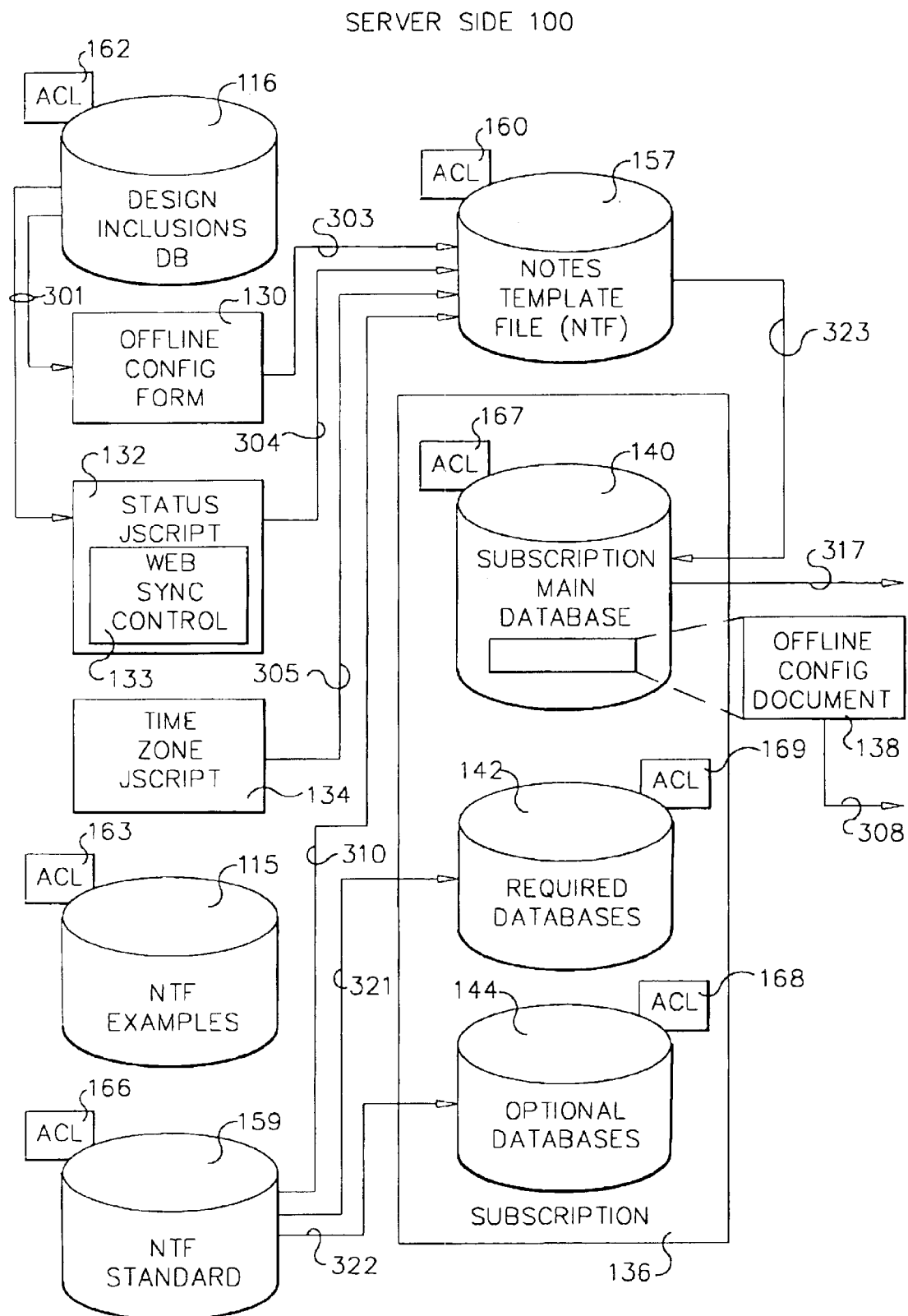
Figure 9:
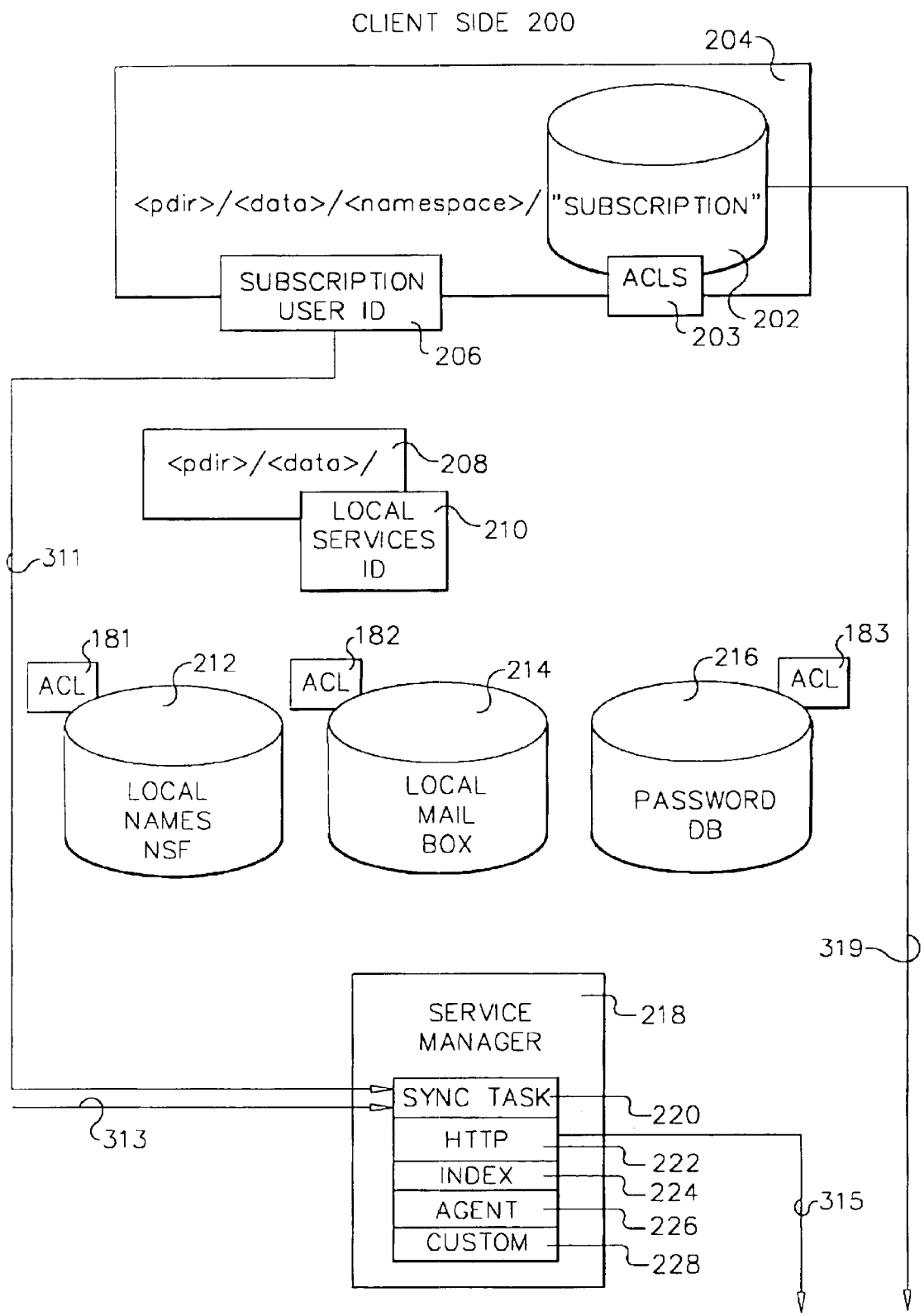
FIG. 9 and FIG. 10 illustrate the system of the client of the preferred embodiment of the invention.

Referring to FIGS. 6–10, the architecture of the preferred embodiment of the system of the invention will be described. FIG. 7 and FIG. 8 illustrate server segment 100 and FIG. 9 and FIG. 8 illustrate client segment 200. FIG. 6 illustrates the protocol interfaces between server 100 and client 200, with download element 146 shown on boundary 300 between segments 100 and 200.

II.B. Protocol Interfaces (FIG. 6)

Referring to FIGS. 6–10, as will be more fully described hereafter in connection with the methods of the preferred embodiments of the invention, interfaces among the component elements of server element 100 and client element 200 are represented by line 301 from design inclusions database 116 to offline configuration form 130 and status Java script 132; line 302 from security policy document 110 to ID repository database 111; line 303 from offline configuration form 130 to Notes template file (NTF) 157; line 304 from status Java script file 132 to NTF 157; line 305 from time zone Java script file 134 to NTF 157; line 307 from server 104 through download element 146 on interface 300 download page 230 element download control 234; line 308 from offline configuration document 138 to download page 230; line 309 from download page 230 download control element 234 to HTTP 106; line 311 from subscription user ID 206 to synchronization task 220; line 313 from server 104 to synchronization task 220; line 315 from HTTP 222 to browser 244; line 317 from subscription main database 140 to application page 238 Java script file 240; line 319 from "subscription" 202 to application page 238; and line 323 from NTF 157 to subscription main database 140.

II.B. 1 Protocol Interface 307 and Download Control 146

Referring to FIG. 6, protocol interface line 307 represents the download transmission channel, which involves processing of an ID context from Domino server API (DSAPI) ID generator 108 through download control 146 to the corresponding download page 230 element 234. Channel 307 inherits from channel 308 the same security context: that is, its secure or not secure nature. DSAPI 108 looks up or creates IDs for transmission on interface channel 307, and requires that credentials inferred by access through channel 309 have been qualified to full name. A full name is the user name according to a certifying authority, and could be a person name plus a certifier group. Example: Carl Kraenzel@Lotus, where the person name is "Carl Kraenzel" and the certifier group is "Lotus".

Download control 146 is an implementation of a download plug in or download ActiveX, either being used on interface 300 to extend the capability of browser 244. A Java variation of a browser extender may also be provided. Generically, these download elements 146 represent different embodiments of equivalent download elements. In the exemplary embodiments herein described, a plug in download element 146 is used to extend the capabilities of a Netscape browser, and an ActiveX download element 146 is used for a Microsoft Internet Explorer (IE).

II.B.2 Protocol Interface 308

Protocol interface line 308 represents the transfer over HTTP of the offline configuration document 138 as a web page which is in its client rendition download page 230. Line 308 thus represents, in this embodiment, a conversion from Lotus Notes to HTML format, and then to client 100 as HTTP. This line 308 executes transfer in one of two modes: secure and insecure. In the insecure case (that is, HTTP) the identity of the source 100 cannot be confirmed by the browser, nor is the data considered secure. In the secure case the identity server 100 is verified by client 200, and data transfer is encrypted. This latter mode is commonly called secure sockets, or use of the secured socket layer SSL, and referred to as HTTPS, using standard web browsing definitions. SSL defines an encryption mode between a browser and a web server that encrypts the information transmitted and identifies the server identity.

II.B.3 Protocol Interface 313

Protocol interface 313 represents a Notes remote procedure call (RPC) interface for responding to a replication request from Sync task 220. This is a request that server 104 replicate and ship down interface 313 the subscription main database 140, required databases 142, and any flagged optional databases 144. When synchronization task 220 runs, it retrieves user name and password from database 216 appropriate to the subscription 202 at hand and uses those credentials along with subscription user ID 206 to satisfy and create a Notes RPC to initiate a protocol connection via line 313.

II.B.4 Protocol Interface 317

Protocol interface 317 provides a secure socket (SSL) interface for loading application page 238 from source subscription main database 140 to the client browser 244. Protocol connection 317 has the same attributes of protocol and authentication as previously described for connection 308 (HTTP, login, etc.)

II.C. Server Segment (FIG. 7, FIG. 8)

Server segment 100, once rendered fully functional, includes a number of program directory, data, and execution files. These include <pdir> directory element 102, <pdir>/<data> data element 118, <pdir>/<data>/<Domino>/HTML/download data element 122, <pdir>/<data>/Domino/HTML/download data element 122, <pdir>/<data>/Domino/HTML/download/filesets data element 124, <OS>_<SERVICE>.exe,.inf execution elements 126, and <OS>_<LOCALE>.exe,.inf execution element 128.

Server element 104 contains HTTP element 106, and HTTP element 106 contains Domino Server API ID extensions 108. Policy ID database 114 includes security policy document 110 and download log 112. Other databases include ID repository database 111, design inclusions database 116, NTF samples database 115, server mailbox database 127, and standard Notes template file (NTF) database 159. Other elements of server 100 include status Java script file 132 including web synchronization control plug in 133 and web synchronization control ActiveX 135; time zone Java script file 134; Notes template file 157; and subscription element 136. Subscription element 136 includes subscription main database 140, which includes offline configuration document 138, and required databases 142 and optional databases 144.

II.C.1 Server 104/HTTP 106

Server 104 is, in this preferred embodiment, a Lotus Domino web server. A Domino server 100 without DOLS would, in these FIG. 7 and FIG. 8, contain only program director <pdir> 102 and server 104 with HTTP element 106.

II.C.2 DSAPI ID Extensions 108

Domino Server API ID extensions 108 provides an ID context in accordance with one of three policies, or forms: (1) an ID can be generated on server 104; (2) an ID can be determined from a database store 111 on server 100; or (3) an ID can be requested from the user. In cases 1 and 2, an ID is shipped down to client 200 as represented by channel 307. In case 3, the user will be prompted for a file previously received outside this system.

II.C.3 ID Policy DB 114

ID policy database 114 is a highly secure collection of security policy documents 110. It is accessed by DSAPI ID generator 108 in response to a user login request on channel 307 to determine the security domain of that user and determine the correct response. Policy documents 110 are created and managed by a server administrator. Policy documents 110, in turn, may provide a pointer to ID repository database 111 to enable DSAPI ID extensions 108 to lookup the ID corresponding to the login request. ID policy data base 114 can contain sensitive information such as passwords and certification IDs that match them. These are tools normally safeguarded by administrators as the crown jewels, the keys to their security kingdom. Therefore ID policy database 114 is implemented with a strong access control list 161 (that is, only administrators are allowed to access it).

Figure 12:
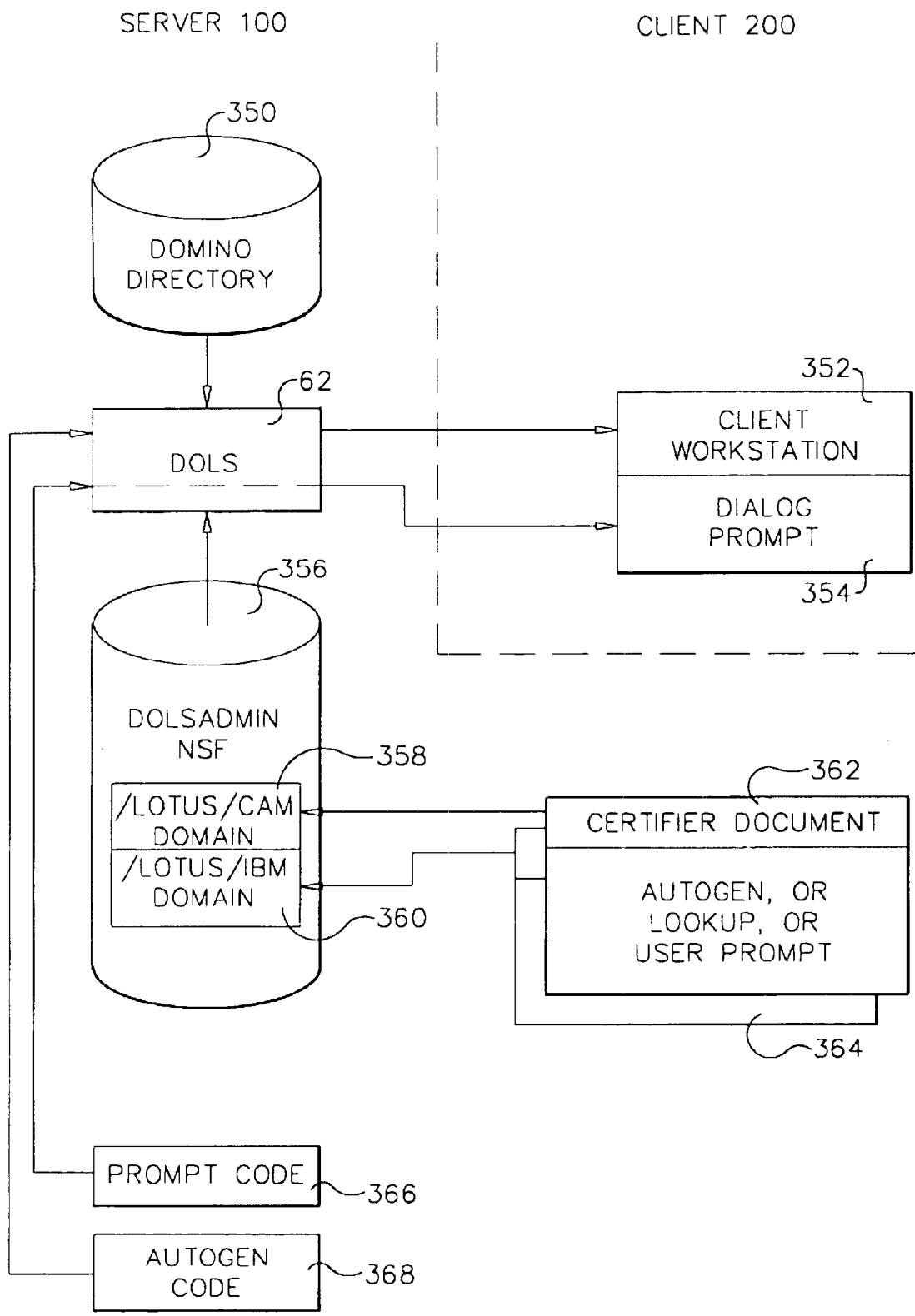
FIG. 12 is a high level diagram of a system for automatic issuance of user ID's with reuse of previously deployed ID's.

Referring to FIG. 12, ID policy database 114 is shown in a preferred embodiment of the invention as DOLSADMIN NSF 356, with a view provided of certifier document 362 for domain/lotus/cam/358 and of certifier document 364 for domain/lotus/ibm/360.

II.C.4 ID Repository DB 111

ID repository database 111 is a collection of subscription user IDs. The end result of an interface 307 request is a user ID, which may, depending upon the user domain from security policy document 110, be determined from database 111 by DSAPI ID extensions 108 for storage in<name space> directory of element 204.

In accordance with a further embodiment of the invention, offline management and replication with respect to a plurality of user identities is provided in the context of a master password protected password database. In accordance with this exemplary embodiment of the invention, local replications of a subscription are filtered by user ID and password.

Figure 11:
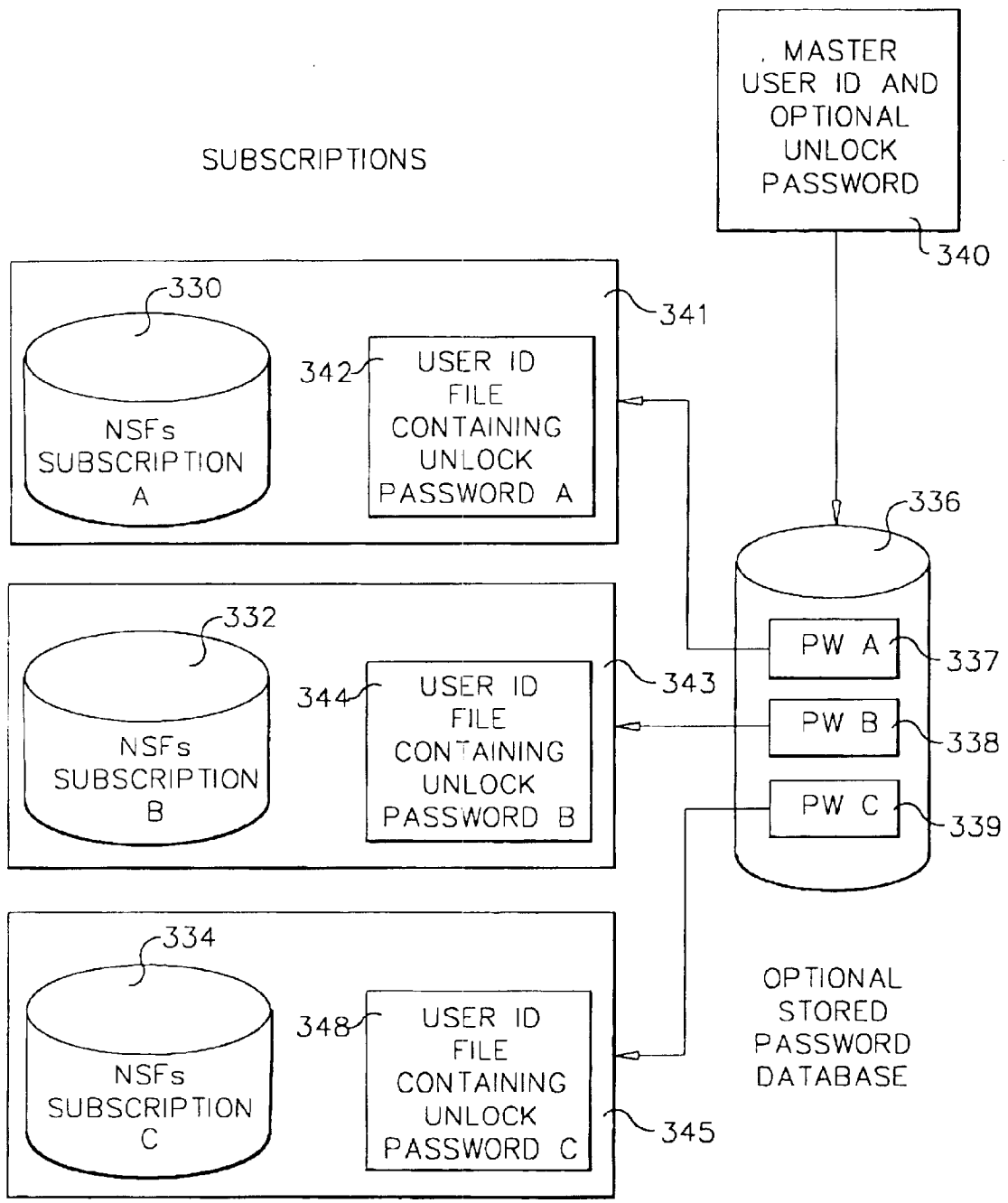
FIG. 11 is a high level diagram of a system for enabling simultaneous replication of multiple user identities.

Referring to FIG. 11, on client side, master user ID and optional unlock password 340 encrypts and protects password database 336. Password database is a repository for stored passwords 337–338. These are optionally stored by users and, when stored, provide access to subscriptions 341, 343, 345, respectively. Subscription 341 includes a user file 342 containing an unlock password for subscription A NSFs 330. Subscription 343 includes a user file 344 containing an unlock password for subscription B NSFs 332. Subscription 345 includes a user file 348 containing an unlock password for subscription C NSFs 334. Master user password 340 is set from iNotes client options menu 266, as will be described with respect to FIG. 14. Notes provides three levels of encryption, simple, medium and strong. Password database 336 is preferably encrypted with strong encryption.

Password database 336 is thus configured to protect a plurality of user names and password pairs 342, 344 that may be used in background replications of a plurality of subscriptions 341, 343, 345. Of these subscriptions corresponds to a server subscription 136, client subscription 202 pair in FIG. 8 and FIG. 9 and have a user name 206 tightly associated with them).

In the event that password database does not include an entry, say entry 339, with a stored password for subscription 345, then the user is prompted for the password upon attempting access to subscription, say subscription 345, to verify against password C 348. Under these circumstances (without a password PWC 339 in database 336), unattended access for, for example, replication of subscription C 334 NSFs is not allowed.

II.C.5 Compressed File Sets 118–128 and Protocol Interface 309

File sets 118–128 contain the program logic required to support a client application. The .inf files describe the larger .exe files. These files are transferred to client 200, in one embodiment of the invention, over line 309, which in today's technology may be a slower, network connection. In another embodiment of the invention, these files 118–128 are loaded to a CD for transfer to the client machine.

II.C.6 Design Inclusions DB 116

Design inclusions database, or resource template file 116 is, in the preferred embodiment, a Lotus Notes template (.ntf) file. This template file 116 is used in connection with an instance of standard .ntf file 159, as is represented by line 310, to produce a subscription main database template .ntf 157.

II.C.7 Offline Configuration Form 130

Offline configuration form 130 is a file containing design elements for describing in template file .ntf 157 the design of database 140.

II.C.8 JScript Files and Web Sync Control 132–134

A Java Script (jscript) file is used to create interactive applications in which most of the information processing is done on the client side, thus increasing the efficiency of the application by reducing the amount of traffic between client and server. A component of status Java script file 132 is web sync control 133, which is provided for synchronization with browser 244. Web sync control may be a plug in adapted for a Netscape browser 244, or an ActiveX for a Microsoft IE browser 244. Its client side rendition is web control 241.

II.C.9 Notes Template Files (.ntf) 157, 115, 159

Standard .ntf file 159 provides an initial template file design for modification and augmentation into Notes template file 157. File 157 is an augmented Notes template file initialized from file 159 and into which is stored the design of subscription main database 140 as determined or copied from offline configuration form 130, status Java script 132 and time zone Java script 134. NTF sample database 115 provides examples of augmented templates for a developer to study and use when producing a new, modified template 157.

II.C.10 Subscription 136

Pursuant to the subscription model of the preferred embodiment of the invention, and as implemented in the exemplary embodiment involving iNotes and DOLS, a subscription is a group of databases organized under one set of rules with one login identity to one server. Such a subscription may include several nsf databases that are retrieved from a single path, for example, W3.Lotus.com/HR. A different subscription, to extend the example, may be a group of several nsf databases from a different path, say W3.IBM.com/blue pages.

In accordance with the preferred embodiment of the invention, subscription 136 includes subscription main database 140, required databases 142, and optional databases 144. These databases represent a collection of off-line applications with which authorized users may interact at client 100.

II.C.11 Subscription Main Database 140

Subscription main database 140 is a database selected by the administrator as the main database for this subscription, the behavior of which is governed by forms, views and agents specified using template file 157.

Subscription main database 140 has an offline configuration document 138, described below, and an access control list 167 which requires through regular Domino processes that the user log in over an HTTP 307 connection before the download page 230 can render.

II.C.12 Offline Configuration Document 138

Configuration document 138 includes the names and locations of required databases 142 and optional databases 144, default configuration settings including properties of the subscription 136, the file sets 124 needed for offline execution, the default scheduling properties for synchronization which effect execution of service manager 218 and synchronization task 220 in the end user usage scenarios (yet to be discussed), and the look and feel of download page 230 when it displays in a browser 244. Many or all of these properties could be preset as part of the design found in template file 157.

Offline configuration document 138 will be further described hereafter in connection with its client side rendition 232.

II.C.13 Required and Optional Databases 142–144

Required and optional databases 142–144 are databases selected by the administrator for this subscription 136, the behavior of which is governed by forms, views and agents specified using template file 159.

Figure 10:
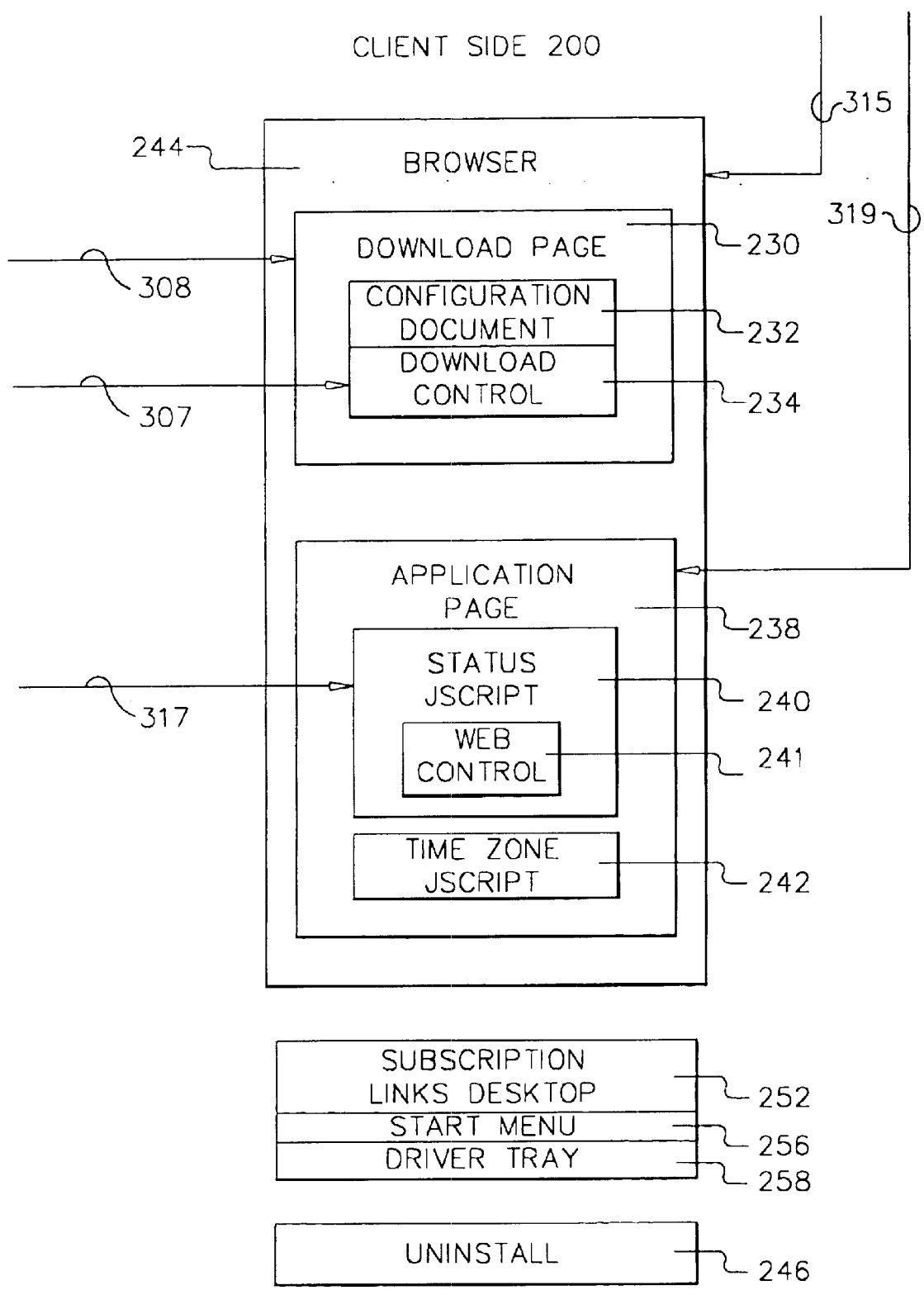

II.D. Client Segment (FIG. 2, FIG. 9, FIG. 10)

Client 200 includes directories <pdir>/<data>/<namespace> 204 into which subscription user identifier 206 is stored, subscription ACLs 203, and file directory <pdir>/<data>/208 into which local services ID 210 is stored; databases local names.nsf 212, local mail.box 214, and password.db 216; service manager 218, including synchronization task 220, HTTP 222, index 224, agent 226 and custom 228; browser 244, including download page 230 and application page 244; subscription links desktop 252, start menu 256, driver tray 258 and uninstall 246. Download page 230 includes parameters from configuration document 232 (which is the client side 200 rendition of offline configuration document 138), download element 234 (the client side rendition of download control 146 for ActiveX or plug in, as the case may be). Application page 238 includes Java script status 240 including client side rendition 241 of web control plug in or ActiveX 133 and the client side rendition 242 of time zone Java script 134.

Each database includes an associated access control list (ACL) 160–169, 181–183, respectively.

II.D.1 Subscription 202

Subscription database 202 is the offline rendition of subscription 136. It includes a Domino Web application, its related databases, and the settings specified in the service manager 218.

Figure 14:
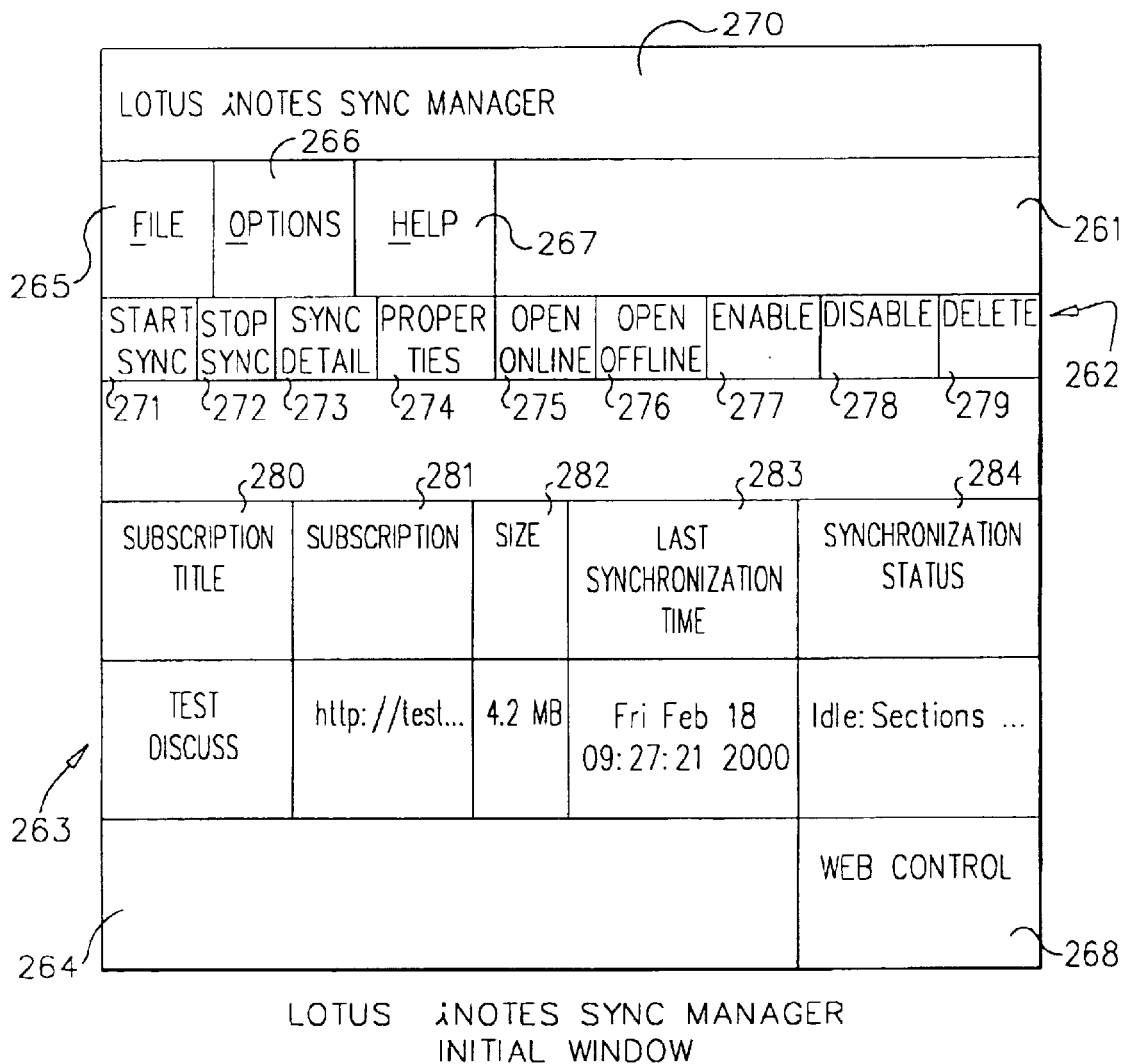
FIG. 14 is a diagram illustrating the initial window display of the service manager of FIG. 9.

II.D.2 Service Manager UI 218 (FIG. 14)

Lotus iNotes Sync Manager represents an exemplary embodiment of service manager 218. Users automatically install Lotus iNotes Sync Manager 218 on local machine 200 when they download a Domino application enabled for offline use, or install a CD prepared in accordance with the present invention. iNotes Sync Manager 218, the end-user component of Domino Off-Line Services, enables the user to manage and maintain offline subscriptions 202 to Domino Web applications.

The service manager 218 UI is provided with an open on line/open off line button in the sense of a toggling selection control for subscriptions, which are off line web applications 202, 136 with schedules.

Referring to FIG. 14, the initial window 270 of service manager 218, is illustrated. The user interface for service manager 218 includes the following components:

Menu bar 261
Button bar 262
Subscription window 263 with a list of subscriptions 202 and detailed information on each
Message bar below the subscription window In addition, both the online and offline applications may have Web controls 268. If the offline application has been installed with a Web control, upon clicking Go Offline or Go Online control 268, a pop-up menu displays a list of actions.

Menu Bar 261

The following menus appear on the Service manager 218 menu bar 261:

File 265
Options 266
Help 267

File menu 265 includes the following choices:

Properties, which displays a subscription properties box for the subscription 202 selected by highlighting in subscription window 263.
Delete, which prompts for confirmation on whether the selected subscription should be deleted. If yes is selected, local data and files associated with the selected subscription 202 are deleted.
Exit, which exits from Service manager 218 and shuts down all its subprocesses, including scheduled synchronizations. When service manager 218 is restarted, synchronization schedules are also restarted.

Options menu 266 includes the following choices:

Auto-start —sets a Windows registry key so that service manager 218 starts in the background when the user logs on to the operating system. This ensures that any scheduled synchronizations occur. By default, Auto-start is checked. To disable Auto-start, uncheck it.

Proxy Settings —displays the Proxy Settings dialog box. Some settings may already be specified, based on the settings of the default browser. By selecting "Use a proxy server to synchronize" a user may set the type, address, and port number of the proxy server to use to connect to the Internet.

Master Password—sets or changes the password used to log on to Service manager 218.

Encoding—specifies the character set for creating or editing documents. When highlighted, the encoding option displays a list of available character sets for selection.

Help menu 267 provides access to online help for service manager 218, customer support, and version and copyright information.

Button bar 262 provides buttons controlling actions with respect to a subscription 202 selected by highlighting in subscription window 263. Each button may be represented by an icon (not shown) and/or by text (as shown).

Start sync 271 immediately starts the synchronization process for the selected subscription. Only disabled or idle subscriptions may be selected.

Stop sync 272 stops the synchronization process for the selected subscription. Only active synchronizations may be selected.

Sync detail 273 displays details about synchronization. A dialog box displays information on synchronization status and a progress bar on synchronization completion. There is also a Stop Sync button in this dialog box. This button 273 can only be selected during a synchronization. When the synchronization is done, clicking a close button exits from the dialog box.

Properties 274 displays the subscription properties box. This is used to view the selected subscription.

Open online 275 launches the default browser 244 and opens the starting URL of the currently selected subscription 136. The user can then interact with the online version of the subscription. The online 136 and offline 202 versions of the subscription may differ, especially if not recently synchronized.

Open offline 276 launches the default browser 244 and opens the starting URL of the offline version 202 of the subscription selected in subscription window 263. The user can then interact with the offline version 202 of the subscription. The online and offline versions of the subscription may differ, especially if they have not recently been synchronized.

Enable 277 enables the synchronization schedule for the selected subscription.

Disable 278 disables the synchronization schedule for the selected subscription.

Delete 279 prompts for confirmation and, if confirmed, deletes selected offline subscription by deleting local data and files associated with the selected subscription.

The QuickPlace server didn't have a user interface (UI) for synchronization. This invention provides an iNotes synchronization manager, a utility having a tool bar with lists of subscriptions, including provision for server log in, scheduled replication, and access to data bases. This enables a plurality of replications to run simultaneously. The advantages of simultaneous operations is increased performance in certain situations, and it is required if different ID's are allowed to run at different schedules. Thus, it is much more than the replicator tab on Notes.

D.2.1 Agent Services 226

Figure 13:
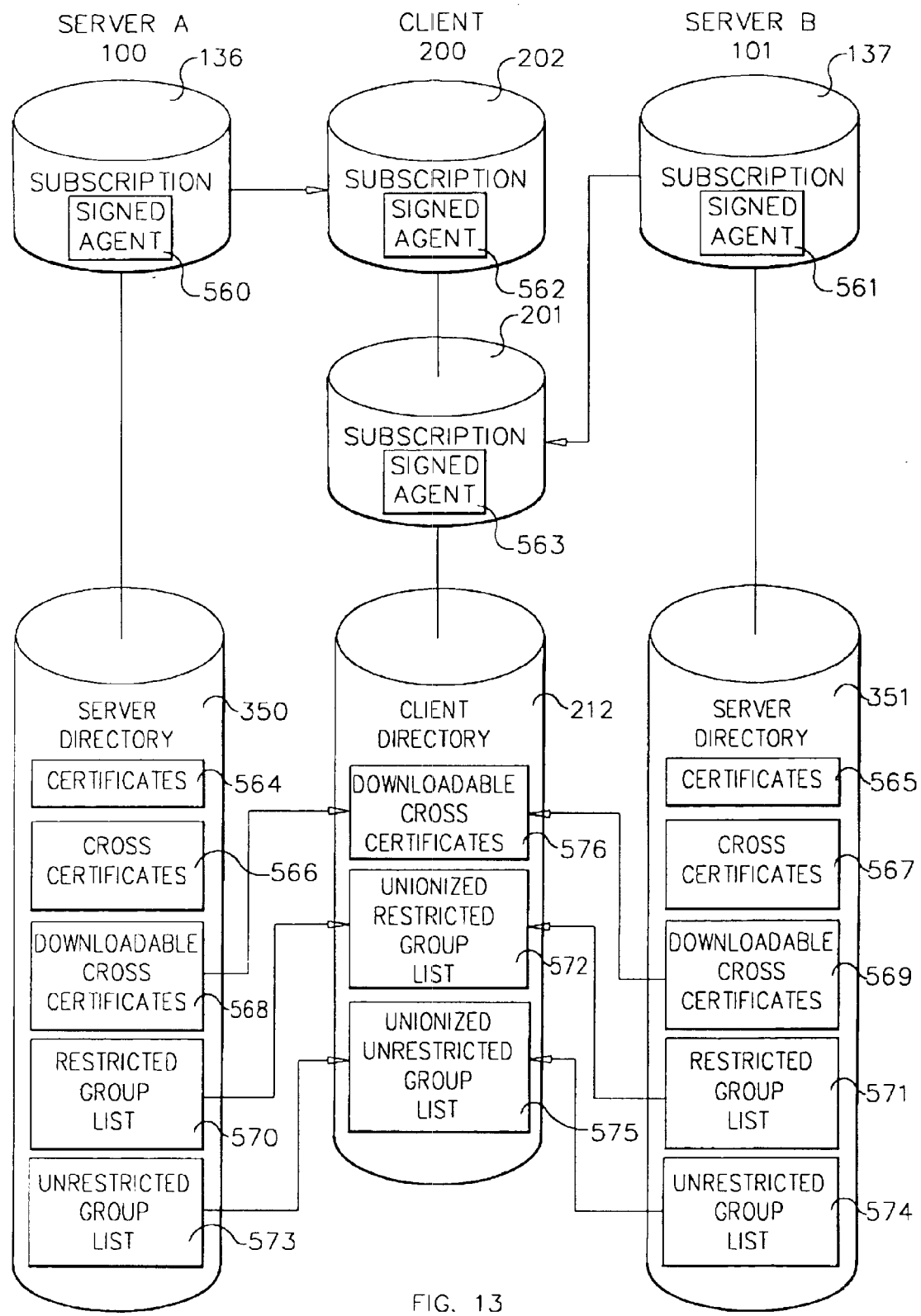
FIG. 13 is a high level diagram of a system for issuing cross certificates and enabling execution of agents.

Referring to FIG. 13, system components exercised in qualifying signed agents 560, 561 from a plurality of servers 100, 101 for execution as signed agents 562, 563 at a client 200 are illustrated. Server directors 350, 351 include certificates 564, 565, cross certificates 566, 567, downloadable cross certificates 568, 569, restricted group lists 570, 571 and unrestricted group lists 573, 574. Client 200 includes client side rendition 202, 562 of application 136 with signed agent(s) 560, and client side rendition 201, 563 of server application 137 with signed agent(s) 561; and client directory 212 with downloadable cross certificates 576, unionized restricted group list 572 and unionized unrestricted group list 575. A signature is a name plus an electronic certificate. Group lists 572, 575 include names, not complete signatures. Unionized group lists include the union of names 570, 571 and 573, 574 from all servers, in this example two servers 100 and 101 are shown, but there may be more.

An unrestricted agent is generally designated as such because it need not do anything particularly risky, such as change the system clock or add/delete data files.

The operation of the system components illustrated in FIG. 13 will be described hereafter in connection with FIG. 22.

Figure 15:
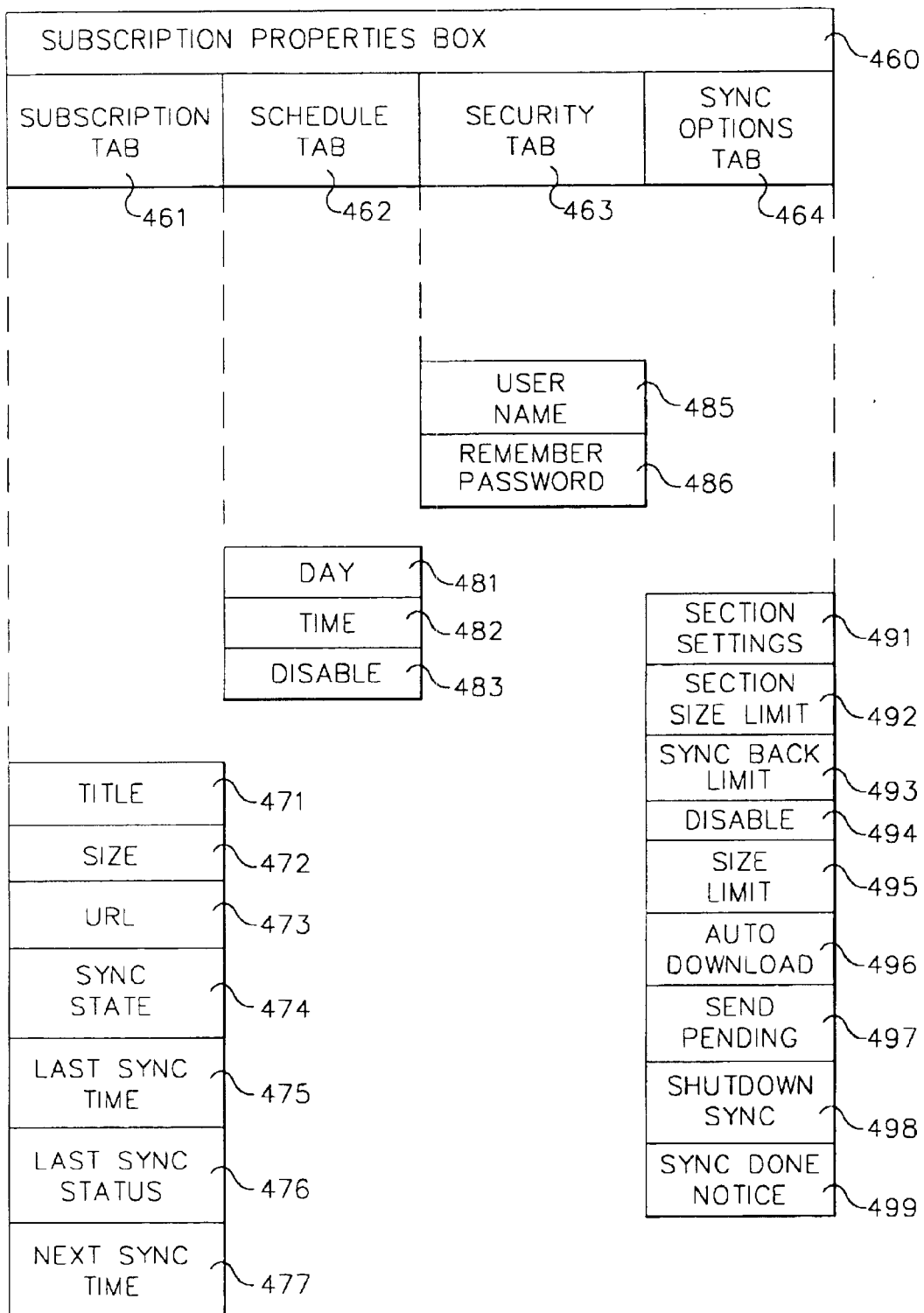
FIG. 15 is a diagram illustrating a subscription properties box.

II.D.3 Subscription Properties Box (FIG. 15)

Referring to FIG. 15, subscription properties box 460, available through service manager 218, may be used to view and change security and synchronization setting for a subscription selected in subscription window 263. A subscription properties box 460 includes subscription tab 461, schedule tab 462, security tab 463, and synchronize options tab 464.

To display subscription properties box 460, a user does one the following:

Highlight a subscription in the subscription window 263 and click the properties button 274

Highlight a subscription in the subscription window 263 and choose File-Properties Double-click a subscription in the subscription window 263

Right-click a subscription in the subscription window 263 and choose the properties subscription tab Subscription tab 461 is used to view status information and to enter a title for the subscription. It includes the following fields.

Title 471, which is the title given the subscription. This title appears in the list of subscriptions in the subscription status window 263. It can be change by entering a new title.

Size 472, which lists the size of offline subscription 202 in megabytes.

URL 473, which specifies the Web address of the online application 136.

Current sync state 474, which lists one of the following status states for synchronization:

Active—a synchronization is in progress

Idle—the subscription is idle now but the next scheduled synchronization is listed Disabled—the subscription is not currently scheduled for any synchronizations Last sync time 475, which displays the date and time of the most recent synchronization.

Last sync status 476, which list details about the most recent synchronization, including the number of errors and the number of documents sent and received.

Next sync time 477, which displays the date and time of the next synchronization.

Schedule tab 462 is used to specify dates and times for synchronization between an offline subscription 202 and the online Domino Web application 136. It includes the following fields.

Day 481, which specifies the day(s) synchronizations are to occur. (The synchronizations occur at the time of the day specified in the Time field 482.) Daily, weekly (day or days of the week), or monthly (day or days of the month) can be specified.

Time 472, which specifies the time of day when synchronization is to start. The user can specify that synchronization be repeated during the day at certain intervals (for example, every 15 minutes or every hour) and also specify a time for the repeating synchronizations to stop.

Disable schedule 483, which disables synchronization.

The schedule the user specifies at this tab 462 overrides any default schedule that the administrator may have specified for the online Domino Web application.

Security tab 463 is used to verify the user name and to enter a password for the currently selected subscription. It includes the following fields.

User name 485, which displays the user name the user enters to begin the synchronization of a subscription.

Remember password 486, which is used to enter the password to begin the synchronization of the subscription.

This password is set by the administrator, and cannot be changed off line. This password is the same as the one used to access the online Domino Web application. A box next to this field 486 may be checked so that the password need not be entered in each time synchronization is started.

Sync options tab 464 is used to specify synchronization settings. It includes the following fields.

Subscription section ("section" is a term familiar to users of web browsers, and is equivalent in Notes lexicon to "database") settings 491, which lists the subscription, including both required and optional sections available on the server for offline use. A section in the Section Settings window may be highlighted to change its settings.

Limit section size 492, which sets a download limit of [number] MB to the size of the section selected in the Subscription Section Settings window 263.

Sync back limit 493, which limits download to only documents saved [number] days back—this box is checked to choose a number of days beyond which not to synchronize any documents that have been saved. This setting applies to the section selected in the Subscription Section Settings window 263. Checking this box speeds up synchronization.

Disable 494, which is checked to disable synchronization of an optional section selected in the Subscription Section Settings window 263. A required section may not be selected.

Size limit 495, which limits total size to [number] MB for the subscriptions in the sections listed in the Subscription Section Settings window 263.

Auto download 496, which may be selected to automatically download any new optional files on servers 100. This box is checked to find new available files on the server and bring them off line. The files are then listed under optional sections in the subscription section settings window 263.

Send pending 497, which may be selected to send pending emails before shutdown. This box 497 is checked to send any pending outgoing mail messages (such as in a workflow application) before closing or exiting from Service manager 218.

Shutdown sync 498, which may be selected to synchronize new or modified documents before shutdown. This box 498 is checked to synchronize new or modified documents before closing or exiting from service manager 218.

Sync done notice 499, which may be selected to notify when synchronization is completed. This box 499 is checked to receive a message each time the synchronization process finishes. If warnings are displayed during the synchronization process, selecting this option displays a message box for each warning. If not checked, a related database may not finish synchronizing because it reached the size limit set for it. If check, the user will be notified that the database reached its limit.

The Subscription window 263 of service manager 218 contains the following information about each subscription:

Subscription title 280, which is the name given the offline subscription or the title assigned by the administrator.

Subscription URL 281, which is the full URL of the online subscription 136.

Size 282, which is the size in megabytes of the offline subscription 202.

Last synchronization time 283, which is the day, date, and time that the subscription was last synchronized. The following icons may also appear:

An icon representation that new or modified documents have been downloaded offline. Once the offline subscription has been opened, this icon disappears.

An icon representation that the subscription was not configured properly, the last synchronization occurred over 30 days ago, or a synchronization has never occurred.

If no icon appears, the offline subscription contains no new or modified documents.

Synchronization status 284, which displays the current synchronization status of the subscription:

Active—a synchronization is in progress

Idle—the subscription is idle now, but the next scheduled synchronization is listed Disabled—the subscription is not currently scheduled for any synchronizations In addition, the end status of the most recent synchronization is displayed. If a problem occurred during the last synchronization, an error message may be displayed here as well.

During synchronization, a status dialog box may be viewed. This may be done after synchronization has begun for a subscription by clicking the Sync Detail button or icon 473 in tool bar 262. A dialog box appears with information on synchronization status (the same information that appears in the status bar during synchronization) and a progress bar on synchronization completion. There is also a Stop Sync button in this status dialog box. When the synchronization is done, a close button may be clicked to exit from the dialog box.

Message bar 264 for Service manager 218 is located below the subscription window 263 and shows the current status of the subscription highlighted in the Subscription window as well as status messages for service manager 218 (Lotus inotes Sync Manager). For example, it may show when the next synchronization is scheduled for a subscription or when Service manager 218 was started.

To delete a subscription 202, the subscription is highlighted in service manager 218 and the delete button 279 clicked.

II.D.4 Download Page 230

A download page is the page 230 that displays to an end user during the download of a subscription 202 to local machine 200. This page 230 may contain information such as instructions, company graphics, warnings, or tips for the end user.

The fields for controlling the download page are at the bottom of the Offline Subscription Configuration profile document 138. The default selection is "Display default download page contents." This selection contains default text and graphics.

Figure 16:
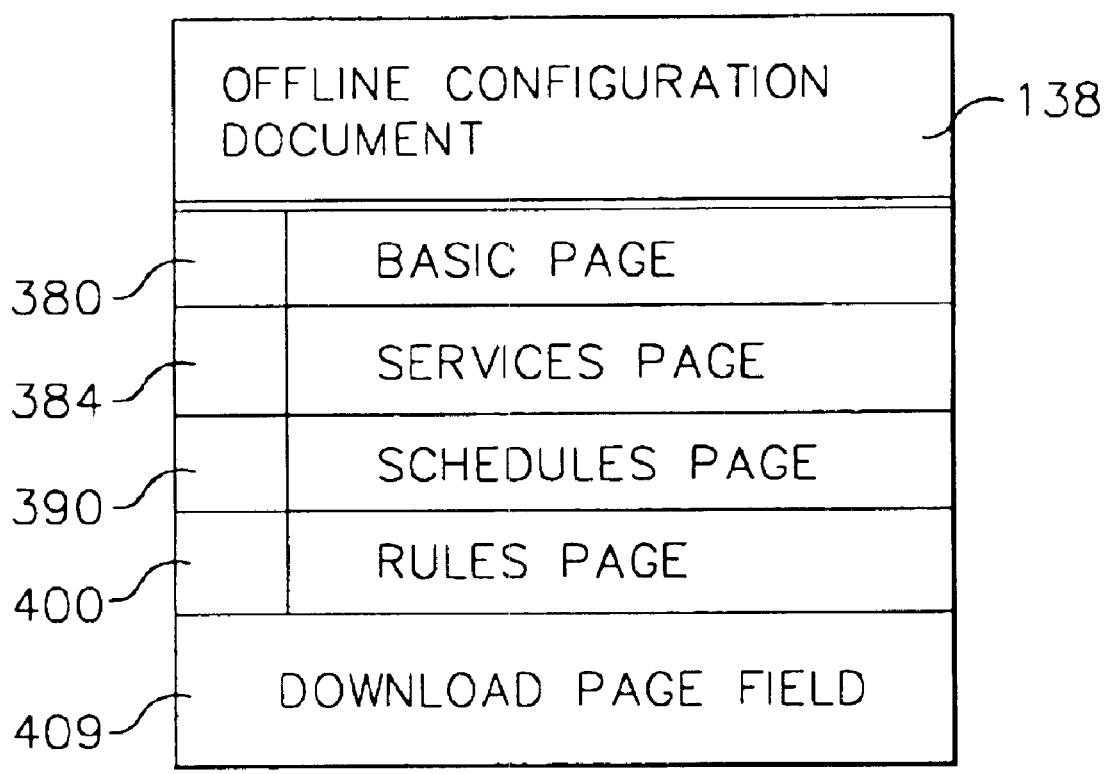
FIG. 16 is a diagram illustrating an offline configuration document.

II.D.4.1 Configuration Document 232 (FIG. 16)

Referring to FIG. 10 and FIG. 16, configuration document 232 is the client side 200 rendition of offline configuration document 138 from subscription main database 140 on the server side 100.

The Offline Subscription Configuration profile document 138, 232 contains the following tabbed pages. Many of the fields have default values which can be changed.

Basics tab 380

Services tab 384

Schedule tab 390

Rules tab 400

In addition to tabbed pages, there is a download page field 409 at the bottom of the profile document. The download page 409 displays the text and graphics that end users see during the download of a subscription.

Figure 17:
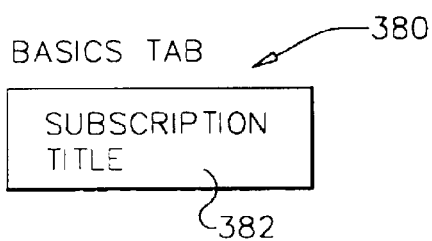
FIG. 17 is a diagram illustrating the basics page of an offline subscription configuration profile document.

II.D.4.2 Basics Page 380 (FIG. 17)

Referring to FIG. 17, the basics page 380 of the Offline Subscription Configuration profile document 138, 232 contains the field "Subscription title" 382. This is a computed field that contains the name of the subscription (database) 202. This name also appears in the Subscription window of Lotus iNotes Sync Manager 218.

Figure 18:
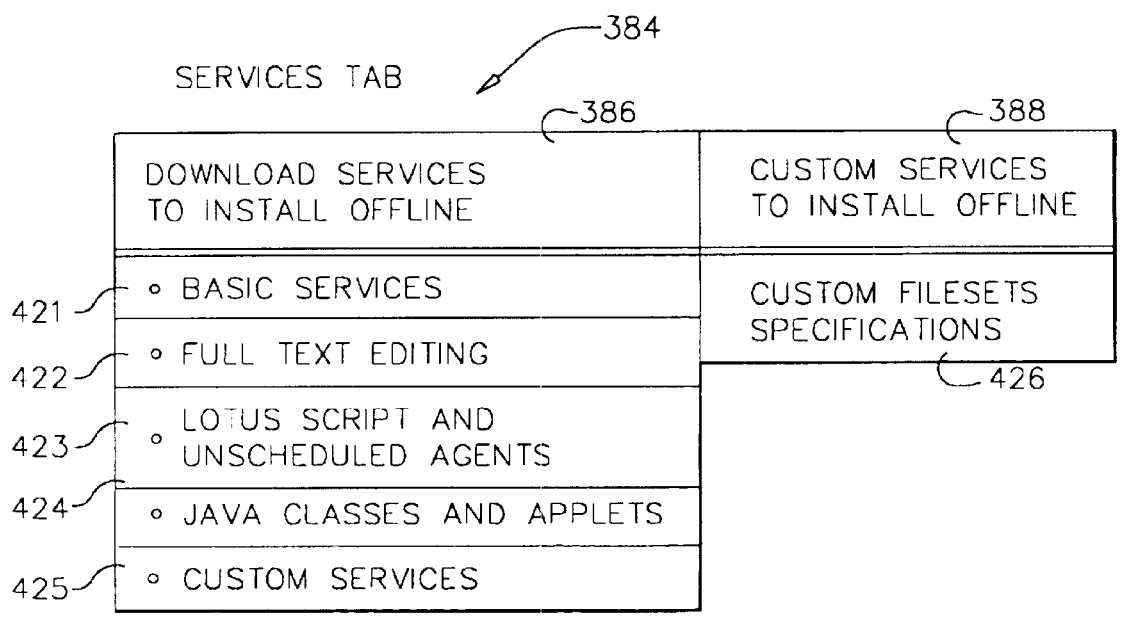
FIG. 18 is a diagram illustrating the services page of an offline subscription configuration profile document.

II.D.4.3 Services Page 384 (FIG. 18)

Referring to FIG. 18, the services page 384 of the Offline Subscription Configuration profile document 138, 232 contains Domino services to install offline field 386 and customer services to install offline 388. Domino services to install offline which may be selected include basic services 421 (always selected), full text indexing 422, LotusScript and unscheduled agents 423, Java classes and applets 424, and custom services 425. If custom services 425 is selected, custom services to install offline field 388 appears.

II.D.4.4 Schedule Page 390 (FIG. 19)

Referring to FIG. 19, the schedule page 390 of the Offline Subscription Configuration profile document 138, 232 contains the schedule type field 392, frequency field 394, limitations field 396, and exceptions field 398, fields that can be preset for the end user. The end user can override most of these fields from within the Subscription Properties box of Lotus iNotes Sync Manager 218.

II.D.4.5 Rules Page 400 (FIG. 20)

Referring to FIG. 20, the rules page 400 of the Offline Subscription Configuration profile document 138, 232 contains file rule field 402, sync options date filtering field 404, sync operations halt conditions field 406, and sync options optional actions field 408.

Figure 21:
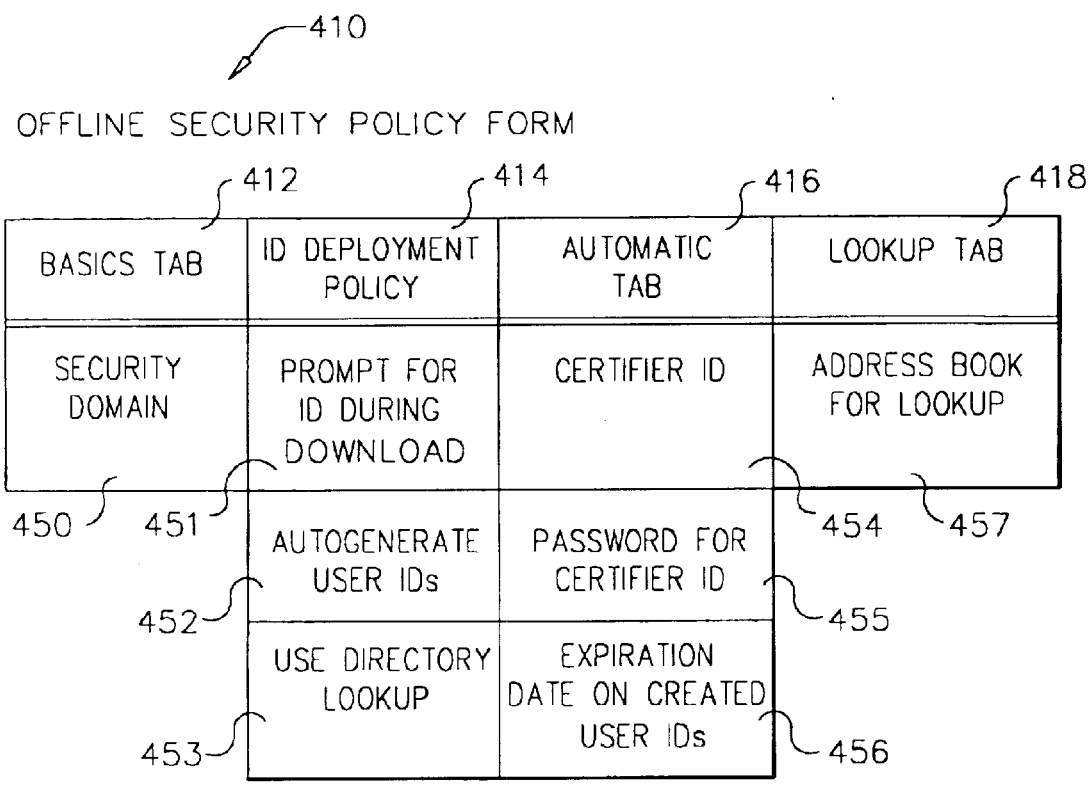
FIG. 21 is a diagram illustrating an offline security policy form.

II.D.4.6 Offline Security Policy Form 410 (FIG. 21)

Referring to FIG. 21, an Offline Security Policy document 110 is created by an administrator for Domino applications enabled for offline use. In Domino Administrator, DOLADMIN.NSF is opened and Create-DOLS Offline Security chosen. The Offline Security Policy form 410 appears, containing basics tab 412, ID deployment policy tab 414, automatic tab 416 and lookup tab 41.8, with several fields for entering security specifications. To view all Offline Security Policy documents 110, an Offline Security button in DOLADMIN.NSF may be clicked.

II.D.5 Application Page 238 (User Experience)

Application page 238 provides, together with service manager 218, the user experience. The end user experience may utilize application page 238 in an offline mode as is represented by line 319 to experience subscription 202, or in an online mode as is represented by line 317 to experience subscription 136.

II.D.5.1 Web Control 241

Web sync control 241 is a displayed instance of web sync control 133. When activated from a request protocol connection 317, or an online display, web control 241 displays an indicator showing the user that he is looking at an online version, and a default indicator displayed for selecting "go offline". If application page 238 is being rendered in an offline context as represented by line 319, then the default selection indicator would display "go online". The indicator is in the user interface of status JScript 241, or time zone JScript 242. A download control element 234 renders the user interface as a subregion of a web page, where within the page it displays is a designers choice.

II.D.6 Other Components 246–258

Subscription link desktop 252, start menu 256, and driver tray 258 provide alternative ways for launching service manager 218. That is, service manager 218 can be launched and display its user interface (UI) 270 by desktop links 252, by links found in Windows (TM) start window 256, or by clicking on its minimized icon which appears in Windows driver tray 258.

Uninstall 246 is, which is found in the Windows start menu (Start-Programs-Lotus iNotes-Uninstall Lotus iNotes), may be used by the user to uninstall all client side software and data installed by the system (service manager 218 and all its subscriptions).

II.E. Access Control Lists

Every database has an access control list (ACL) that specifies the level of access that users and servers have to the database. In the case of users, the ACL determine the tasks that users can perform in a database. In the case of servers, the ACL determine what information within the database the servers can replicate. For each user name, server name, or group name in an ACL, the administrator can specify an access level, access level privileges, user type, and roles. In accordance with the preferred embodiment of the invention, access control lists on databases replicated to client 200 impose on users of those databases identical access authority as on the databases at server 100 from which they were replicated. Data elements protected by an ACL include, but are not limited to, documents, fields, agents, replication formulas, subforms, pages, framesets, folders, access control lists, paragraphs, views and extended database properties therein. The access control element includes lists of names of users and servers authorized to access the data element, together with their roles and authorization levels. Access control entries assigned to users determine the tasks that can be performed in the database, and those assigned to servers determine what information within the database the server can replicate.

Part III. System Operation

In accordance with the preferred embodiment of the invention, Domino Off-Line Services (DOLS) provides a way for browser users to utilize Domino Web applications offline. Using a browser, the user takes an application offline, makes changes, and synchronizes those changes with the online application. Notes software, available from Lotus Development Corporation, works with Domino applications to provide a distributed client/server database application to let users organize, process, track, and use information to suit their individual needs. Notes/Domino servers consolidate the tools needed to effectively communicate and collaborate in an organization by providing, inter alia, email, group discussion, workflow, scheduling, document management and many other functions. Domino databases are built on three basic concepts: documents, views and forms. Documents are collections of data items which can be retrieved as a set. Views are the ways of accessing the indices or summaries of documents stored in a database while forms are templates for accessing and displaying documents.

To enable a Domino Web application for offline use, the Web site developer and the Web site administrator first configure and set up the application. The developer and the administrator perform such tasks as setting up the server, setting up security, copying new design elements into the application, and specifying synchronization settings.

Once the application is enabled, the end user opens the online Web application. By clicking on a control or an icon, the user downloads the application to the local machine. The first time an application is downloaded, Lotus iNotes(TM) Sync Manager, a utility for managing the offline application, is installed on the user machine (client). Using a browser, the end user may change the offline application and then synchronize the change with the online Domino Web application.

The offline access provides an end user with just about all the capabilities of the online Web application. DOLS supports authentication, composing, editing, deleting, sorting, categorizing, full text searches, Java applets, and workflow. DOLS also supports full data replication, retains application logic, and supports the full Notes security model.

The operation of a preferred embodiment of the system presented in FIGS. 6–10 will be described hereafter in the context of four experience scenarios (processes or methods), as follows: the designer scenario, the administrator scenario, the download scenario and the end user scenario.

III.A. Designer Processes

The Domino Web site developer copies design elements into the application being enabled for offline use and then specifies default configuration settings for the offline subscription.

The developer first opens in Notes the DOLS resource template (also referred to as design inclusions database, or DOLRES.NTF 116), which contains all design elements needed to enable a Web application for offline use, and then opens the same template in Domino Designer and copies design elements from the template to the Web application being enabled for offline use. The design elements copied include several pages, a form, an agent, and several subforms. One of the design elements is a Web control page that allows end users to take an application offline by clicking a "Go Offline" control.

The developer then closes Domino Designer, opens the Domino application in the Notes client, and specifies default settings by editing the Offline Subscription Configuration profile document.

Referring primarily to FIG. 7 and FIG. 8, the designer process starts with design inclusions database 116. The objective of the designer process is to produce a subscription Notes template file (.ntf) 157, starting from resource template file 116 and an existing design, typically something like a standard .ntf file 159. The act of augmenting design resource template file 116 is represented by line 301, which is accomplished by cutting and pasting design inclusions found in file 116; that is, by copying them across into an instance of a standard .ntf file 159 to produce a subscription main database template .ntf 157. The design elements for describing in template file .ntf 157 the design of database 140 include offline configuration form 130, status Java script 132 and time zone Java script 134.

Java script 134 is optional to the system, and when used gives an experience augmentation for end users. Status Java script 132 is also technically optional, but when not used greatly reduces end user experience by eliminating Java script status 240. Absolutely essential is offline configuration form 130.

An augmented template file 157 is produced by copying into and then from a standard .ntf file 159 status JScript 132, time zone JScript 134, and offline configuration document 138. This is the minimum required configuration of system for the designer scenario. The designer can optionally preset the offline configuration settings by modifying form 130 after it has been stored in template file 157. These presets would then be available to the administration experience to be described hereafter.

III.A.1 Create Offline Subscription Configuration Document

The Web site developer initially creates an Offline Subscription Configuration profile document 138 for each Domino application being enabled for offline use. An application, even if it includes multiple databases, has only one profile document.

Using Domino Designer, the developer copies the "Edit Offline Configuration" agent into the Domino application being enabled for offline use. In Notes, the developer then fills in the Offline Subscription Configuration profile document 138 by choosing Actions-Edit Offline Configuration. Once the developer finishes the profile document 138, the administrator may choose to override some of the default settings.

Referring to FIG. 19, in operation, under schedule tab 390, selecting schedule type 392 as daily 430 enables specification of the time of day for synchronization to occur; as weekly 431 enables selection of the days; as monthly 432 enables selection of the day of the month; as day(s) of the week 433 appears only when weekly 431 is selected as the type, and enables selection of the day(s) of the week on which synchronization is to occur; as day of the month 434 appears only when monthly 432 is selected as the type, and enables specification of the day of the month on which synchronization is to occur; as start time 435 enables specification of a time of the day when synchronization is to occur on days scheduled for synchronization.

Selecting frequency 394 as repeating schedule 436 schedules replication to repeat at specified intervals after the initial start time; and as interval 437 enables specification of the time between repeating synchronization operations.

Selecting limitations 396 enables specification of the time 438 at which synchronization is to stop.

Selecting recurrence exceptions 398 as schedule disable 439 results in disabling of synchronization after once. The schedule remains disabled until the end user chooses to enable it.

Referring to FIG. 20, in operation, selecting file rule field 402 of required files to replicate 440 enables specification of the list of databases 142 that must always be present offline for this subscription 136 to function as intended. The path and file name of each required database is specified, and may be selected by clicking a browse button to choose databases. Databases selected must be in the Domino data directory or a subdirectory below the Data directory. For example, if there exists a subdirectory called Dev below the data directory and it contains a database called mynsf.nsf, Dev\mynsf.nsf is entered. Specifying more than one required file 142 or optional file 144, may be done by appropriate use of directory names and wildcards.

Selecting file rule 402 optional files to replicate 441 enables specification of a list of optional databases or directories 144 that can be part of this subscription 136. The path and file name of optional databases to be downloaded as part of this same subscription 136 are entered. For example, in addition to the required database(s) 142, it may be desired to download a related help database or an archived discussion database, and these may be selected by clicking a browse button and then choosing from among the databases displayed in the Domino data directory or a subdirectory below the data directory. For example, Dev\my2nsf.nsf may be selected. If only Dev is selected, then every database in the Dev directory is downloaded. Multiple directories may be specified.

Selecting file rule 402 automatically replicate new DBs 442 results in automatically downloading and synchronizing new (or newly detected) databases from the server. For example, a selected optional database 144 may itself create new databases. If this occurs, then the new databases are automatically downloaded and synchronized.

Selecting sync options date filtering 404 enables specification of a preset number of days 443 beyond which the user is not to synchronize any modified documents. For example, if thirty days is specified, only documents created or modified in the last thirty days will synchronize. The end user can override this setting 443.

Selecting sync options halt conditions limit database size 406 enables specifying a number 444 to control the maximum size in megabytes of the offline database. When the database gets bigger than the size 444 specified, synchronization is automatically halted. The end user can override this setting.

Selecting subscription size limit 445 enables specifying a number to control the maximum size of the entire offline subscription. When the subscription gets bigger than the size 445 specified, synchronization is automatically halted. The end user can override this setting.

Selecting sync options optional actions 408 of notify on completion of sync 446, results in the end user receiving a message when synchronization is complete. The end user can override this setting. If warnings are displayed during the synchronization process, selecting this option displays a message box for each warning.

Selecting route mail on client shutdown 447 results in pending outgoing mail messages being sent before the user exits from Lotus iNotes Sync Manager 218. The end user can override this setting.

Selecting replicate on client shutdown 448 results in synchronization occurring before the user exits from Lotus iNotes Sync Manager 218. The end user can override this setting.

III.A.2 Create Download Page

The default download page 230 is from the "DOLS Download Instructions" subform. Alternatively, a download page for each subscription may be made in lieu of the default page. To create download page, select "Display only the custom contents below" from the Offline Subscription Configuration profile document 138. A rich text field appears to create a download page 230 specifically for this subscription 136. In addition to text, HTML and images may be added this field.

III.A.3 Create Offline Security Policy Document

Selecting basics tab 412 brings up security domain field 450 for specifying the domain that affects the security of this subscription. For example: /CAM/Lotus or /Lotus. The default security behavior is to prompt end users to provide ID files when going off line. That default can be explicitly controlled and overridden for given security domains by setting an ID policy here that differs from the default.

Selecting ID deployment policy tab 414 brings up fields 451–543. ID deployment policy 414 selection field 451, prompt for ID during download, is the default policy and results in the user being prompted for a user ID. Such IDs must first have been distributed to end users.

Selecting automatically generate user IDs 452 results in generation of a user ID automatically using a certifier in the offline security policy document 110. If this option 452 is selected, the Automatic tab 416 appears. At this tab, a certifier ID 454 may be attached, password 455 set, and the ID expiration date 456 set.

Selecting use directory lookup 453 brings up use lookup tab 418 for ID lookup and causes a search for existing IDs in the Domino Directory 350 (formerly called the Names and Address book, and referred to as the ID repository database 111 in FIG. 7).

Automatic tab 416 appears only when automatically generate user IDs 452 is selected. Certifier ID field 454 is a rich text field (File-Attach) used to attach a Certifier ID file which must match the Security domain field 450 specified at the basics tab 412 of this document. If the Certifier ID file 454 and the Security domain 450 fields do not match, end users will experience access errors because the IDs that were automatically issued to them will have canonical names that do not match the access control lists (ACLs).

Password for certifier ID field 455 is used to record the certifier ID password. Stored passwords are protected by appropriately restricting the access control list (ACL) of this database. The password entered by a user, which is case-sensitive, must be correct or the installation will not proceed.

Expiration date field 456 is used to set the expiration date for any Notes IDs generated automatically.

Lookup tab 418 appears only when use directory lookup 453 is selected. Address book for lookup field 457 is then used specify the relative path of the Domino Directory 350 (a.k.a. Names and Address book 111) from which to pull IDs. The target database must have standard Domino Directory views and documents with IDs attached to the person documents. A browse button may be clicked to search for a Domino Directory.

III.A.4 Use Domino Off-Line Services Sample Template

Domino Off-Line Services includes the following template as an example 115 of one that has been enabled for offline use:

Web discussion template—doldiscsw50.ntf

This sample template includes the required design elements. An Offline Subscription Configuration profile document 138 (Actions-Edit Offline Configuration) is created for each new database 140 created from this template 115. This is included as an example of a template that has been enabled for offline use.

III.A.5 Create Custom Filesets

Selecting Custom services to install offline 388 enables specification of custom filesets 426. These specify the custom fileset(s) 124 to be downloaded when the end user installs a subscription. For example: MYCUSTOM. In these specifications, multiple filesets are separated with commas.

Each custom fileset is downloaded and then unpacked. For Windows platforms, the downloader looks for two files in the Filesets directory, each with the prefix N, including a self previously created extracting .exe (N MYCUSTOM.EXE), which is unpacked when the end user downloads, and an INF file (MYCUSTOM.INF) which contains information needed during the download. Files to be execute when the custom fileset is unpacked may be specified, as can arguments within the files to be executed.

Creating custom filesets, to be described hereafter, provides more information on custom filesets and on creating INF files.

Figure 23:
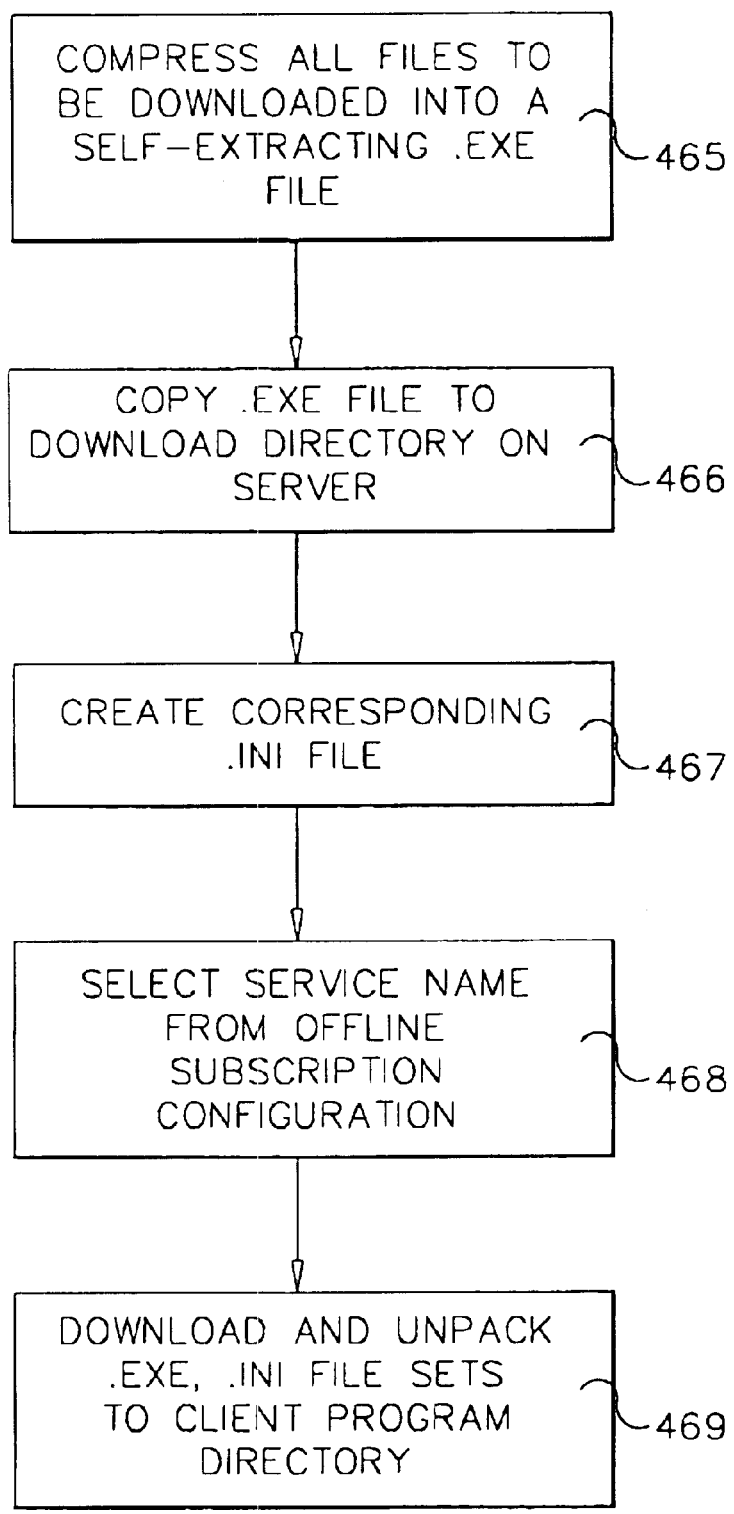
FIG. 23 is a flow diagram of a process for creating custom file sets.

Referring to FIG. 23, custom filesets within filesets 124 can be created that contain files that are unpacked when the end user downloads the application. Domino Off-Line Services 62 includes a utility to help create and set up a custom fileset (the client instantiation of which is custom 228), which is done as follows:

In step 465, a self-extracting executable (.exe) file is created. This .exe file contains the files to be downloaded to the user's machine 200. All the necessary files need to be compressed into one self-extracting .exe file.

In step 466, the .exe file is copied a directory on the Domino server.

In step 467, an inf file is created. The INF file is associated with the .exe file, has the same file name (except for the suffix), is in the same directory, and contains information needed during the download.

In step 468, he name of the custom service file is entered in the "Custom Services to install offline" field. This field is located on the Services page of the Offline Subscription Configuration profile document 138.

In step 469, these files are downloaded and unpacked on the end user's machine 200 in the iNotes client program directory 260. Then, setup.exe, one of the unpacked files, runs on the user's machine from the iNotes client program directory 260.

III.A.6 Use Customize Subform

The DOLS Customize subform provides a way to override default values in the fields of other subforms. Identity icons can be attached into this subform, as described hereafter. In the exemplary embodiment of FIG. 8, the DOLS customize subform represents that part of offline configuration form 130 which may be customized.

After the DOLS Customize subform has been copied into the Domino application, it can be edited in Domino Designer. Because this subform loads after all other subforms, events such as PostOpen can be used to override the default values for other fields. Fields validation formulas that override other fields can also be put into this subform. During download, the DOLS Customize subform is loaded by a DSAPI filter 108 on the server and all validation formulas are re-triggered to bring in any new information.

III.A.7 Set Up Multiple Database Applications

Both the Web site developer and the Web site administrator must perform tasks to enable a Domino Web application for offline use. The developer performs these tasks to enable a Domino Web application for offline use: copies several design elements from DOLRES.NTF 116 (using Domino Designer) to the Domino application being enabled for offline use; and edits and adds default values to the Offline Subscription Configuration profile document.

Figure 24:
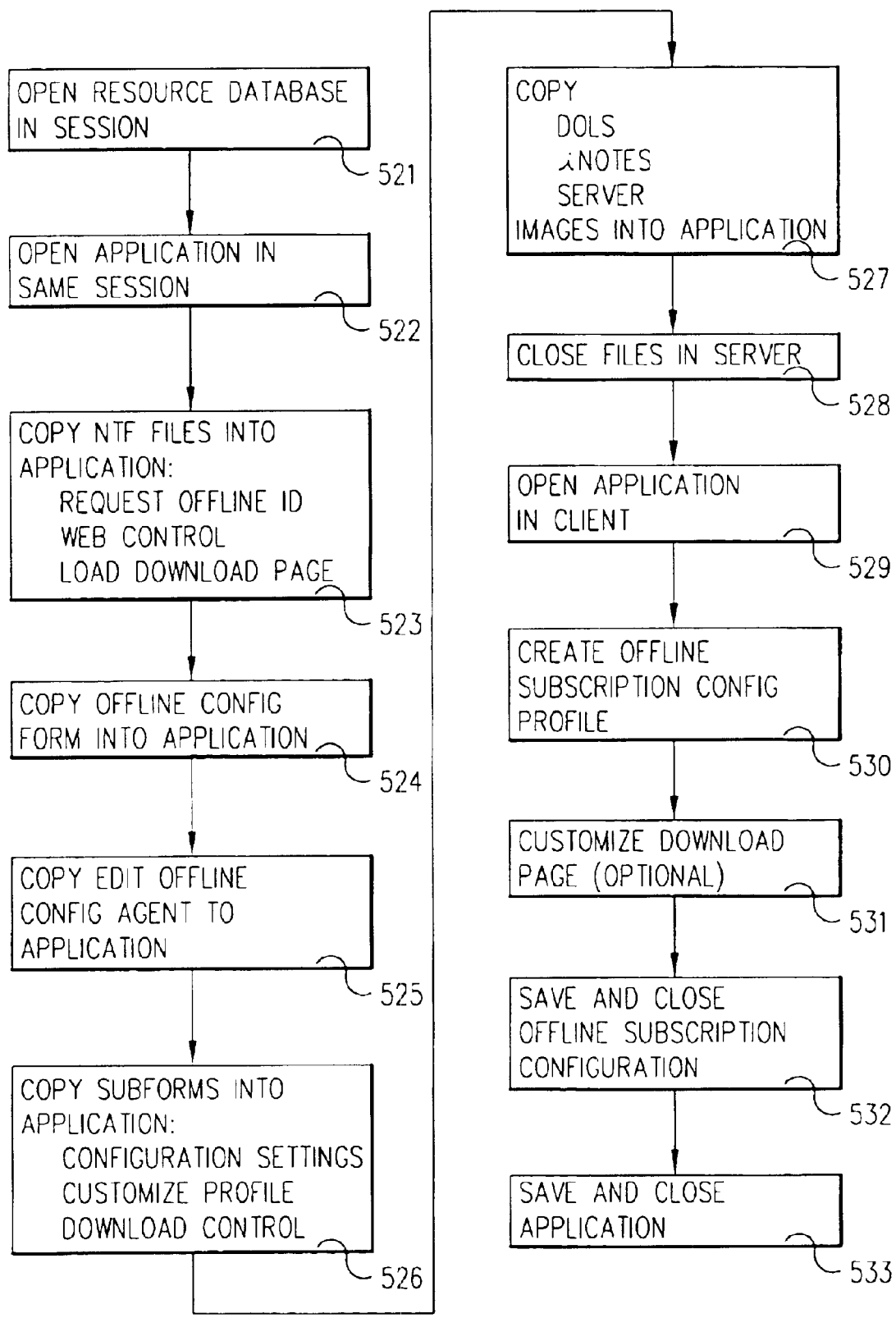
FIG. 24 is a flow diagram of a process for enabling a web application for offline use.

Referring to FIG. 24, executing the following tasks enables a Domino Web application for offline use.

In step 521, DOLRES.NTF 116 (DOLS Resource Database) is opened in Domino Designer.

In step 522, in the same Designer session, the Domino application to be enabled for offline use is opened.

In step 523, the following pages are copied from DOLRES.NTF 116 into the Domino application:

If the application includes more than one database, the DOLS design elements are only copied to the main database, and not to each of the databases.

a. DOLS Request Offline ID b. DOLS Web Control.

This page loads ActiveX and/or plug-ins which enable "Go offline" and "Go online" menu items from within the online and offline Domino applications. When the user clicks "Go Offline" or "Go online," a pop-up menu appears with several options. This is the recommended page to use for going offline. The preferred way to use this page is to include it as a frame in the main frameset of the application. Alternatively, the contents of this page can be cut and pasted to another page or design element. Each application can have only one Web control.

c. DOLS Load Download Page

This page is used to provide an icon instead of the DOLS Web Control in the application. This page contains the necessary JavaScript so that the end user clicks an icon to begin the download. An advantage of using this page instead of the DOLS Web Control page is that it downloads faster. Unlike the Web Control page, there is no pop-up menu. The recommended way to use this page is to include it as a frame in a frameset. Alternatively, JavaScript can be cut and pasted to another page or design element. The icon this page uses is named DOLS.GIF. If it is desired to have the end user click a different icon, the new icon image can be created by choosing Resources-Images, clicking New Image Resource, and adding the new icon. Then replace the references to DOLS.GIF in the JavaScript contained in this page with references to the new icon.

In step 524, the following form is copied from DOL-RES.NTF 116 into the Domino application:

a. DOLS Offline Configuration

This form contains the Offline Subscription Configuration profile form.

In step 525, the following agent from DOLRES.NTF 116 is copied into the Domino application:

a. Edit Offline Configuration

This agent is used to create or edit an Offline Subscription Configuration profile document. This agent is accessed from the Actions menu of the Domino application being enabled for offline use. (A Delete agent may be included in this template for unusual circumstances, such as a failed upgrade.)

In step 526, the following subforms are copied from DOLRES.NTF 116 into the Domino application:

a. DOLS Configuration Settings

This is the table of fields that can be configured, and inherits its design from DOLRES.NTF 116.

b. DOLS Customize

This subform is used to customize the profile document. This is the only subform that should be modified, and it can be left hidden or mad visible. Fields or computed fields and be created, and fields in other subforms can be modified dynamically.

C. DOLS Download Control

This form contains the JavaScript that loads the Web Control when downloading. This subform only displays in a browser, and inherits its design changes from DOL-RES.NTF 116.

d. DOLS Download Instructions

This subform contains the default text that appears to the end user during a download. To create different default text, choose "Display only the custom contents below" in the Offline Subscription Configuration profile document.

In step 527, the following images are copied from DOL-RES.NTF 116 into the Domino application:

a. DOLS.gif b. iNotes_bnnr.gif c. servers.gif

In step 528, DOLRES.NTF 116, the Domino application being created creating, and Domino Designer are closed.

In step 529, the Domino application just enabled for offline use is opened in the Notes client.

In step 530, an Offline Subscription Configuration profile document is created by choosing Actions-Edit Offline Configuration, and the fields of the Offline Subscription Configuration profile document filled in.

In step 531, the download page may be customized. This is the text that is displayed in the browser of the Lotus iNotes Sync Manager when the offline download begins.

In step 532, the Offline Subscription Configuration profile document is saved and closed.

In step 533, the Domino application is saved and closed.

Figure 25:
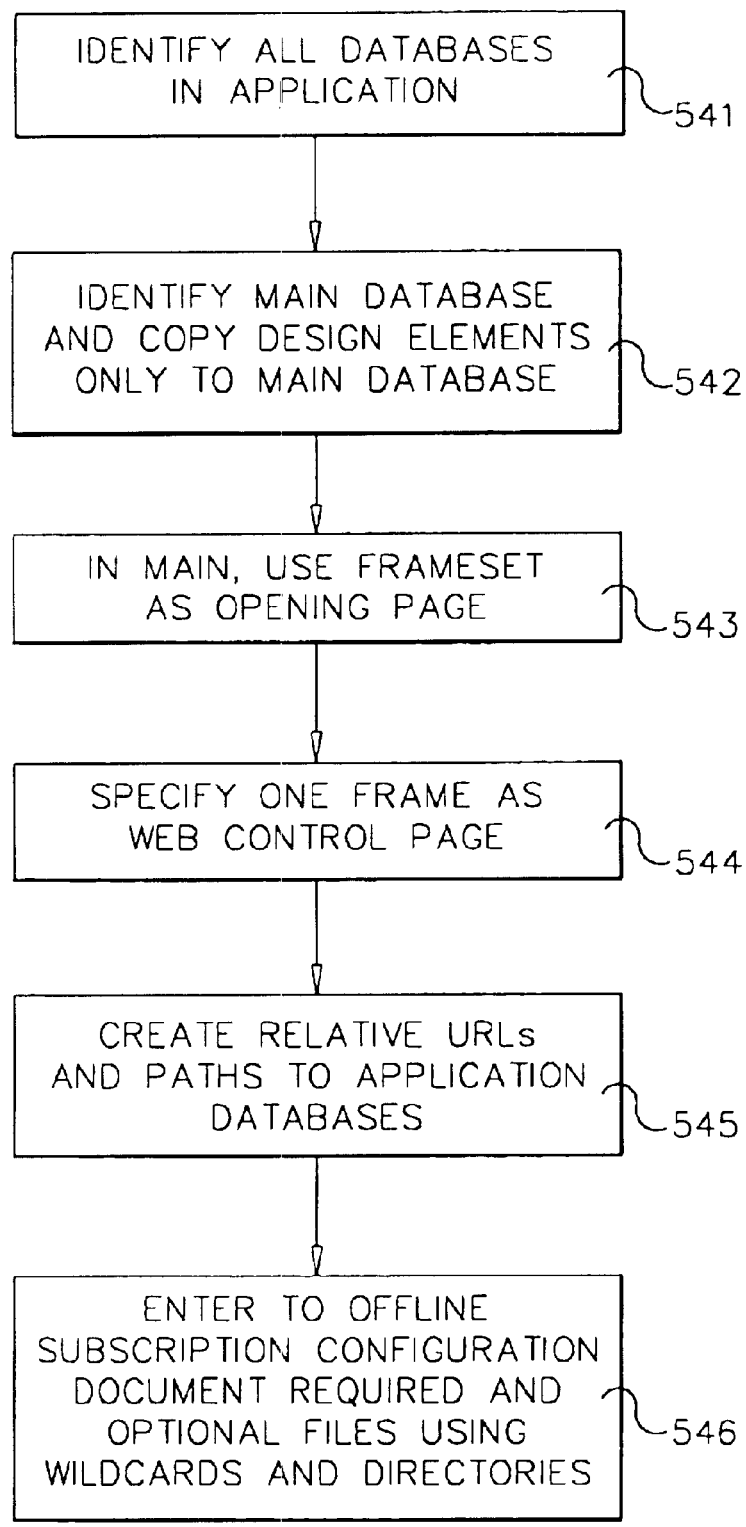
FIG. 25 is a flow diagram of a process for enabling multiple databases for offline use.

Referring to FIG. 25, enabling multiple database applications for offline use involves the following:

In step 541, all the databases in the application are identified at the beginning.

In step 542, the main database 140 is identified and the DOLS design elements copied only to the main database.

In step 543, in the main database 140, a frameset is used as the opening page of the Web application.

In step 544, one of the frames is specified as the Web Control Page. Alternatively, if not using a Web Control page, the frame may be specified to be an icon by using DOLS Load Download Page.

In step 545, relative URLs and paths to application databases are specified. Relative URLs and relative paths a re used, and absolute URLs and paths, which may no t work offline, are not used. For example, if using a URL to reference a database in the Domino data directory, a relative URL is used, such as /dev/mynsf.nsf. For other references to the database (such as Database Open), relative paths, that is, paths relative to the data directory under which the database appears are used. Appropriate links and cross references from one database to another are verified, again using links are relative and not absolute (so they work offline).

In step 546, using wildcards (*) or a directory, values are entered in either of the following fields on the Rules page of the Offline Subscription Configuration profile document 137:

Required files to replicate

Optional files to replicate

If explicit file names are entered in either of these fields, the profile document 137 must be re-edited each time a file is added or deleted. By using wildcards (*) in these fields, all database files or all template files in a given directory are automatically replicated, even files recently added. By using the directory in either of these fields, all files in the directory, whether NSF or NTF, are replicated, even files recently added. For example:

III.B. Administrator Processes

The Domino Web site administrator controls the offline agents, offline security, ID deployment, and download options (including using a CD as an alternate way to install).

The administrator first sets up the server containing the Domino Web application to make sure that Domino Off-Line Services is installed and can run. The administrator then opens the DOLS Administration database (DOLADMIN.NSF) and then the Offline Security Policy document in the DOLS Administration database and fills in the fields that control security and IDs. The administrator may also open the Offline Subscription Configuration profile document as a way to override default settings. Finally, the administrator makes sure that needed agents work offline.

Referring to FIG. 7 and FIG. 8, during the administrator scenario of this exemplary embodiment of the invention, an administrator upgrades a Domino 5.02, or a latter version, server 100 to include Domino Offline Services (DOLS) software.

A Domino server 100 without DOLS would, in these FIG. 7 and FIG. 8, contain only program director <pdir> 102 and server 104 with HTTP element 106. All other elements illustrated in FIG. 7 and FIG. 8 are extensions to the basic system 100 in support of DOLS. The administrator adds server side elements beyond 102, 104, and 106 and prepares subscription 136 for users to go offline in three steps.

The first step is to create databases 142 and 144 from template files 159 and 157. Starting with a production level of notes template file 157, the end product of the developer scenario, the administrator runs an install application (not shown) to install these additional capabilities, creating databases 140, 142 and 144 in the process. The administrator has template file 157 as part of the install or receives file 157 from a third party (which file was created using the designer experience). The administrator, using template file 157 creates subscription main database 140, and may also create one or more required or optional databases 142 and 144 from standard .ntf file 159. The administrator is, in this process, determining what databases 140, 142, 144 are part of subscription 136 (which will eventually correspond to subscription 202 on client side 200).

The second step is to set the access control lists 167, 168 and 169 for every database that is part of the subscription 136. This defines user access rights for those databases 140, 142, 144 and will require users to log in when accessing those databases from browser 244. This log in is required for the authentication represented by line 308. Offline configuration document 138 is part of subscription main database 140.

The third step executed by the administrator in setting up a subscription 136 is to edit offline configuration document 138 at least one time using a Notes client 200. At a minimum, the administrator will list in configuration document 138 the names and locations of required databases 142 and optional databases 144. The administrator also selectively overrides default settings in configuration document 138. These configuration settings include properties of the subscription 136, including the file sets 124 needed for offline execution. Offline configuration document 138 lists the default scheduling properties for synchronization which effect execution of service manager 218 and synchronization task 220 in the end user usage scenarios (yet to be discussed), and the databases 140, 142, 144 that should be part of subscription 136. The remaining optional element that can be altered in document 138 is the look and feel of download page 230 when it displays in a browser 244. Many or all of these properties could be preset as part of the design found in template file 157.

Template file 157 is the subscription main database Notes template file, described in Domino help for designers, and specifies the forms, views, agents—the design that governs the behavior of database 140, and which many similar databases may inherit from template 157.

This may end the administrator scenario. If no further activity done by administrator, then end users will experience a prompt for identification policy during download. Alternatively, the admin can activate other policies, such as auto generate or lookup, by opening ID policy database 114 and creating security policy document 110 for the security domains of the users listed in the access control lists (ACLs) on databases 140, 142 and 144.

III.B.1 Keep Track of Offline Users

In DOLADMIN.NSF 356, an administrator can keep track of offline users by clicking an Offline Users button to keep track of the following information:

Name of each user
Name of the security domain(s)
Applications downloaded
Date(s) of the download

III.B.2 Set Up Selective Replication

This invention provides a way for administrators to control selective replication formulas.

In a Domino Web application that has been configured for offline use, selective replication settings can be specified for the offline application. With this feature, limits can be set on what can be taken off line. The properties boxes for a database and its design elements include styles, options, and other settings that affect how the database looks to users. To change these properties, one must have designer access or higher in the database access control list, then open or select the database, choose file-database-properties, and then change the properties on any of the tabbed pages.

Specifically, to set up selective replication for an offline application in accordance with the preferred embodiment of the invention, the following steps are executed:

1. Open the Database Properties box (not shown) for the database which has been enabled for offline use.
2. At the Database Basics tab, click "Replication Settings."
3. At the Replication Settings dialog box, click the Advanced button.
4. Click the computer button next to the "When computer" field and enter "OfflineSync/DOLS."
5. At the same Advanced button, choose the replication settings. For example, one can check "Replicate a subset of documents" and choose the folders and views to be synchronized to the end users machine. Documents can also be synchronized by formula; for example, by selecting "Select by Formula" and entering a formula so that only selected end users are able to synchronize a selected folder. The following example shows a selective replication formula:
   SELECT From=@UserName|Form="DOLSofflineConfiguration"
6. To save the settings, click OK.

III.B.3 Set Up Agents for Offline Use

The administrator performs the following tasks to enable a Domino Web application for offline use: sets up the server; opens DOLADMIN.NSF and fills in the fields of the Offline Security Policy document; edits the Offline Subscription Configuration profile document and overrides defaults as needed; and sets up agents to work offline.

Referring to FIG. 7, a Domino Web application 136 is enabled for offline use, as follows:

1. Set up the server 104.
This is done by running Domino Server Setup to configure the Domino server, installing all Notes client programs to the same directory (not necessarily the Domino server directory), running the Domino Off-Line Services installer. The Install directory is the Domino server directory.
2. In Domino Administrator, open DOLADMIN.NSF, the DOLS Administration database.
3. Create an Offline Security Policy document 110 for the application being enabled for offline use by choosing Create-DOLS Security Policy.
4. Fill in the fields of the Offline Security Policy document. If IDs are being created dynamically, attach a Certifier ID.
5. Save and close the Offline Security Policy document 110.
6. Close DOLADMIN.NSF.
7. Open the Server document. At the HTTP tab:
   a. Make sure that "ndolextn.dll" is in the "DSAPI filter file filename" field.
   b. Set the output timeout to allow enough time for downloads.
8. Open the access control list 167 for the Domino application 136 being enabled for offline operation (File-Database-Access Control), and add the users and groups for whom access is to be granted to the database 140, making sure that Anonymous has No Access.
9. Edit the Offline Subscription Configuration profile document 138 to set up new default settings for the application 136.
10. Check that the developer has copied all the design elements 116 to the application.

11. Referring to FIG. 13, set up agents 560 to work offline, if the Web application 136 uses them.

Figure 22:
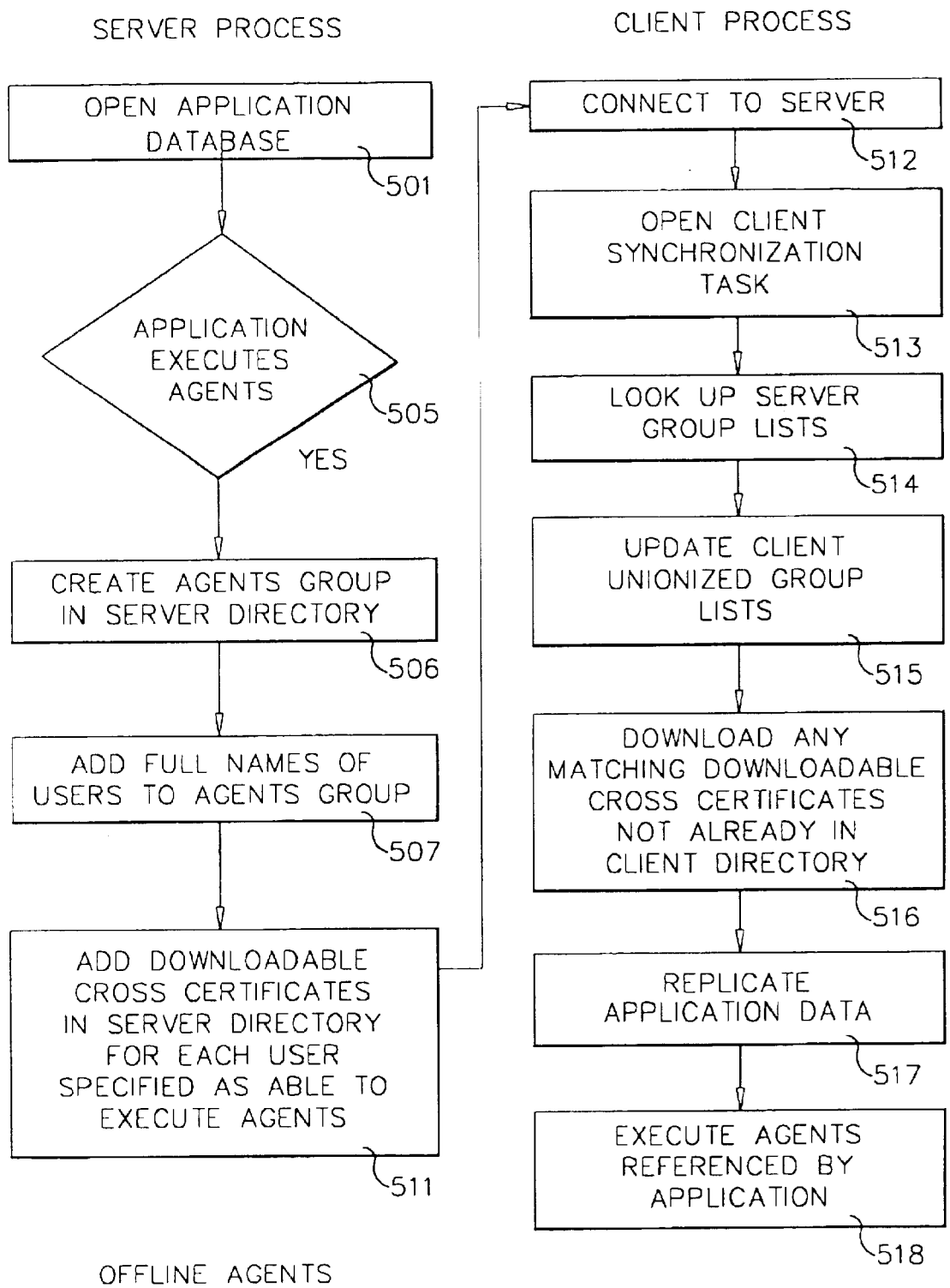
FIG. 22 is a flow diagram of a process for enabling agents for offline use.

Referring to FIG. 22, the process continues as follows.

In step 501, the application 136 is opened.

In step 505 it is determined if application 136 uses agents, whether restricted or unrestricted, and users are to be able to use the agents offline.

If so, in step 506, the administrator sets up the agents 560 for offline use by setting up the groups 570, 573 and cross certificates 566 needed for restricted and unrestricted agents 562 to execute off line.

A cross certifier implies as a prerequisite that two certificates 566, 576 exist. Certifiers are foundation security identifiers generated to present a unique key representation of a particular organization (not individual). It is the basis of that organization's digital signature. An organization creates a certifier so that it can electronically sign other elements within a security model. That is a certificate. A cross certificate 566 is a secondary construct that gives enough information to verify the signature of something signed by a certifier. Referring to the example of FIG. 9, client side agent task 226 will only execute signed agents 562, 563. Task 226 must be able to verify the signature, so must have a cross certificate 576 that validates the signature to the acceptability level of local services ID 210.

The process for setting up groups and cross certificates is as follows:

In step 506, if the Domino Web application 136 has been enabled for offline use and if it executes restricted agents 560, the administrator creates the following group 570 in the Domino Directory 350:

DOLS-Restricted-Agents

In step 507, the full names of the users to this group are added. For Web agents, one of the following is used:

If the agent has been configured to run as a Web user (Agent Properties box-Design tab-"For Web access: Run Agent as Web user"), use the full name of the user(s;).

Otherwise, use the full name of the agent signer who modified it last (for example: NewDevelopment/Lotus).

This name should also exist in what is defined in the Server record (Security-Agent Restrictions) for defining who can use the agent online on the server. The agent signer must have at least Editor access on all databases that need agents to work offline.

Again, in step 506, if the Domino Web application 136 has been enabled for offline use and if it executes unrestricted agents 560, the following group 573 is created in the Domino Directory 350:

DOLS-Unrestricted-Agents

In step 507, the full names of the users to this group 573 are added. For Web agents, one of the following is used:

If the agent has been configured to run as a Web user, use the full name of the user(s). Otherwise, use the full name of the agent signer who modified it last (for example: NewDevelopment/Lotus).

This name should also exist in what is defined in the Server record (Security-Agent Restrictions) for defining who can use the agent online on the server. The agent signer must have at least Editor access on all databases that need agents to work offline.

In step 511, DOLCert.id (installed in the Domino data directory on the server) is used as the certifier ID to create downloadable cross certificates 568 in the Domino Directory 350 for each user or organization specified as being able to execute agents 560. (Administration-Configuration-Certification-Cross-Certify.) DOLCert.id creates cross certifiers issued by "O=DOLS." An ID file or public key may be used for the agent user and organization to generate the cross certificate.

Steps 501–511 are executed at the server 100 with respect to application 136. The same steps may be executed at server 101 with respect to subscription 137, signed agent 561, and server directory 351 including certificates 565, cross certificates 567, downloadable cross certificates 569, and group lists 571, 574, respectively.

Client 200 process steps for enabling execution at client 200 of client side rendition 202, 562 of subscription 136 and agent 560 used by application 136 are as follows. (Similar steps would be executed were client 200 connected in step 512 to server 101 with respect to subscription 137.) In step 512, client 200 is connected to server 100.

In step 513, each time synchronization task 220 runs, before it replicates any data in step 517, it synchronizes all security context, as described with respect to steps 514–516.

In step 514, group lists 570 and 573, on the server 100 connected to in step 512, is examined, and all names not already in client group lists 572, 575 obtained.

In step 515, unionized group lists 572 and 575 are updated. These lists are of restricted and unrestricted signatories, user identities which are allowed to execute agents.

In step 516, any downloadable cross certificates 568 matching new entries (from step 515) to group lists 572, 575 are downloaded to downloadable cross certificates file 576. Downloadable cross certificates are used in verifying the electronic signatures of names in lists 572, 575.

In step 517, sync task 220 having now synchronized security context between client 200 and server 100, subscription 136 data is replicated to subscription 202. In this manner, group lists 572, 575 are corrected, cross certificates 564 downloaded to client directory 212 (as downloadable cross certificates 576), and agents 562, including custom agents written by third parties, used by application 202 may be allowed to run. Such agents 562, 563 contain signatures specifying names of signatories as well as an electronic signature for comparison with downloadable cross certificates 576.

Third party written signed agents 562 are a particularly important aspect of the preferred embodiments of the invention. The client run time includes agent services 226 that executes these agents 526, 563. Agent services 226 has been unbundled and put into the run time, and this requires that the security model be unbundled from the server platform to the run time. Advantages of the present invention include provision for bringing cross certificates 576 down to the client for multiple users, and provision for unionized group lists 572, 575.

In step 518, agent service 226 is activated to execute agent 562 in restricted or unrestricted mode dependent upon successful comparison of the signature in agent 562 to a cross certificate 576 and corresponding authority. This step includes the following. Agent code 226 determines if an agent 562 is supposed to execute on event or schedule, and then checks the signature on the agent, looks to compare if there is a matching downloaded cross certificate 576, and will not proceed if there is a mismatch or no locatable cross certificate. After verifying that the signature in agent code 562 can be authenticated, it checks group lists 572 to determine the type of execution the authenticated signatory is permitted: restricted or unrestricted.

III.B.4 Auto Issue with ID Reuse

A QuickPlace server could generate IDs on the fly. This invention provides for auto-issue of IDs from a Notes database, or the like, together with reuse of previously deployed IDs. New server tools are provided for ID generation, including tools for auto generation, table lookup, and user prompt.

In accordance with the invention, an administrator is enabled to configure a server to distribute user ID's through auto-generation, directory lookup, or user prompt, with the distribution mode being selected based upon user security domain.

Referring to FIG. 7, ID policy database 114 provides a view to administrators of security policy documents 110 for a plurality of domains.

Referring to FIG. 12, ID policy database 114 is shown in a preferred embodiment of the invention as DOLSADMIN NSF 356, with a view provided of certifier document 362 for domain/lotus/cam/358 and of certifier document 364 for domain/lotus/ibm/360.

A primary use that the administrator has for database 358 is to view and post security documents 362, 364 to for each domain a selected ID policy, chosen from among autogen, lookup, and prompt. If the administrator chooses for a given domain 358 a lookup policy, he provides in certifier document 362 a pointer to the correct name and address book on the server (ID repository database 111 in FIG. 7). If the administrator selects the autogen policy for a given domain 358, he attaches a certifier so indicating, which will cause use of autogen code 368 to execute ID generation. If the administrator selects a prompt policy, the certifier document so notes, causing execution of prompt code 366 in response to a need for a user ID. Prompt code is also executed if there is no certifier document for a given domain.

Thus, in accordance with this embodiment of the invention, IDs can auto-generate against multiple domains and execute different security policies according to the domain. Users going off-line will, depending upon the certifier document appropriate to the domain, be prompted for their ID, or have their ID issued by table lookup or auto generation. This security model enables the use by table lookup of ID's that have already been deployed in instances where, for example, an extensive Notes infrastructure already exists and the auto generation of ID's for the establishment of a new infrastructure.

III.B.5 Control Access to Database: ACL & SSL

SSL is a security protocol that protects data by encrypting it as it passes between servers and web clients. The administrator has three options in allowing access to data over an SLL port: (1) anonymous access; (2) name and password access; and (3) access through client certificates. Depending on which of these types of access the server allows for the SSL port and what the database ACL allows, the user may access this database anonymously, may be authenticated with name and password authentication, or may use a client certificate.

III.C. Download Processes

Referring to FIG. 5, download comprises a four stage process. These are: (1) security context; (2) download service file sets; (3) uncompress and set up service file sets; (4) populate client subscription.

III.C.1 Security Context

Referring to FIG. 6, Stage 1, Security Context, executes on interfaces 308 and 307.

Download control functionally renders from inside of download page 230. That is, when client 200 renders page 230 it displays the client side activation 234 of download control 146. In so doing, windows are activated in a page, and information in that page is read to initiate downloading. What is downloaded from server 100 to client 200 in this process is determined by parameters in configuration document 232, which is the client side 200 rendition of offline configuration document 138 from subscription main database 140 on the server side 100.

A download element, or control, 146 is said to straddle the world of server 100 and client 200 objects managed by browser 244. It is important to carefully manage what is running on client 200 and server 100 sides, and browser 244 is extended by element 146 straddling the boundary between them, represented by boundary 300. These elements 146 typically execute on client 200 but read configuration parameters and data from server 100, thus straddling boundary 300.

'Going offline' includes assembling in browser 244 a download page 230 that combines offline configuration document 138 with download element 146 to create a client side rendering of configuration document 232, and download control plug in or ActiveX 234. The resulting download page 230 includes everything needed to download from the server 100 and install on client 200 all elements required to operate client 200 offline with respect to server 100. (Throughout this description, unless otherwise stated, download includes both download and install functions.)

As download page 230 download control element plug in or ActiveX 234 executes (Netscape or IE), client machine 200 is configured through four stages. These are (I) establishing security context, (II) confirming web site identity, (III) creating service file sets, and (IV) downloading subscription data.

Download element 146, by extending the capabilities of Netscape and Microsoft IE, have allowed third parties to add unknown software to extend the functionality of browser 244, and such extensions become new elements of browser 244. The result is that browser 244 can no longer be relied upon by client 200 to protect its data and other objects, and the user must rely on the providers of download controls 146 for that purpose. Stages I and II execute to deal with this exposure. Stage I establishes the security context by asking the user for permission to modify client 200, in effect asking the user if it trusts the web site, or server 100. Stage II establishes whether or not the identity of the web site can be confirmed.

The process represented by line 308 from offline configuration document 138 to download page 230 first occurs, followed by the process represented by line 307 from Domino server API (DSAPI) ID extension 108 through download control plugin or ActiveX 146 to download page 230.

Visiting a download page involves the transfer represented by line 308 from offline configuration document 138 to download page 230 followed by the action represented by line 307 from server 104 to download control element 234. This is initial rendering.

When download control element plug in or ActiveX 234 activates in download page 230, it initiates the download process, which includes, first, establishing a security context. In effect, the user is asked "do you trust this site?". Based on whether transfer 308 was secure or insecure, the user is advised whether identity of the server site can be established. After first determining whether the site can be confirmed, and whether or not that can be confirmed, the user is then asked if the processing should be permitted to continue including installation of programs on the client machine 100.

In case of secure connection, the risk level accepted by the user is to trust or not trust a known entity to run programs on client machine 100. In the instance of an insecure connection, the user, if processing is allowed to continue, is in effect trusting a weakly confirmed entity to run programs on client machine 100, and this is typically done only inside an intranet.

Following 308 processing, the user is asked via download control element 234 if download processing represented by line 307 is to proceed. Line 307 represents the download transmission channel, which involves processing of an ID context from Domino server API (DSAPI) ID generator 108 through download control plug in or ActiveX 146 to the corresponding download page 230 element 234. Channel 307 inherits from channel 308 the same security context: that is, its secure or insecure nature. The ID context provided by DSAPI ID extension 108 is in accordance with one of three policies, or forms: (1) an ID can be generated on server 104; (2) an ID can be determined from a database store 111 on server 100; an ID can be requested from the user. In cases 1 and 2, an ID is shipped down as represented by channel 307. In case 3, the user will be prompted for a file previously received outside this system. A common used other manner is an already in use mechanism for a Notes application/ Domino server as a platform 100, by way of which administrators create IDs and get them to users in some other secure manner.

When DSAPI ID generator 108 is determining how to respond to a request on channel 307, it looks in policy ID database 114 for a security policy document 110 that matches the user login—specifically the security domain of that user, and based upon finding a matching domain, it will execute a response as contained in the policy document (one of the above three policies will be found in the document). Policy documents are created and managed by a server administrator. If no match is found, or if one is found having policy 3, that says to ask the user, the user will be asked (policy 3 also represents the default behavior). If a policy match indicates policy case 2, lookup the ID in storage, then DSAPI ID extension 108 looks into ID repository database 111 pointed to by a matching policy document 110. In case 1, auto generate policy, DSAP ID extension 108 will detach from matching policy document 110 and use a Notes certification ID. It uses that ID to generate a brand new Notes user ID to ship down as a response to a channel 307 request.

To utilize a certification ID, a password is stored on the same security policy document 110. ID policy data base 114 can contain sensitive information such as passwords and certification IDs that match them. These are tools normally safeguarded by administrators as the crown jewels, the keys to their security kingdom. Therefore ID policy database 114 is implemented with a strong access control list (that is, only administrators are allowed to access it).

In identifying a correct security domain from a user login ID, everything to right of first slash is domain. This is foundational characteristics of Lotus NOTES. By way of example, to determine a correct security domain or policy for a person that logs in as CarlKraenzel/CAM/LOTUS, the security policy first checked is that for CAM, and failing a match in CAM the LOTUS security policy is checked.

The information required to check for the correct security domain is provided by a request on channel 307 inasmuch as download control element 234 obtains that information from the browser's context. The browser 244 gets that information at a bare minimum by activating channel 308. The browser is required to get that required information inasmuch as the subscription main database 140 has an access control list 167 which requires through regular Domino processes that the user log in over an HTTP connection before the download page 230 can render. Browser 244 continues to remember those credentials for subsequent requests to server 104, such as on channel 307.

Off line configuration document 138 is contained inside subscription main database 140 so that attempts to render it in the browser 244 will have to pass access control list 167 checks for that database; this requires browser 244 to execute a log in. Log in credentials with which the browser logged in to render a download page are carried through on a channel 307 request for an ID to be found, generated, or otherwise handled that matches those credentials.

A channel 308 access is a pure web access. A channel 307 transfer is a request from server to supply the Notes ID equivalent of those web credentials required for use later in Notes replication.

Download control element 234 establishes security context, first determining if the user trusts server site, and then obtaining ID context. Then control 234 pulls down program executable files in compressed format of file sets 124, 126 and 128.

III.C.2 Download File Sets

Referring to FIG. 6, Stage 2, Download Service File Sets executes on interface 309.

Interface 309 utilizes the same credentials and security context as interfaces 307 and 308, that is HTTP or HTTPS, inasmuch as the user is still logged in. Activating a request on the interface represented by line 309 instructs HTTP 106 to ship down file sets 124 as a response on interface 309. Such 309 requests ask for .inf files 126, 128 that correspond to the current client operating system, and the services 126 that are needed to run the application on that operating system. File sets .inf are header descriptions of the matching .exe files. The files that are needed of all types on the client 200 to run full text indexing are compressed into a self extracting ZIF file with suffix .exe.

Thus, a request on line 309 asks first for all the .inf files, so browser 244 will know versions and sizes of corresponding .exe files (this particularly important in upgrade or reinstall situations). Otherwise, information from the .inf files are used to display progress of download of corresponding .exe files. These .exe files reference a self extracting compressed file.

OS_locale 128 provides compressed resources appropriate to the language locale of the machine.

When download control 234 is preparing to make request on interface 309, an initial determination as to what to request is made based upon information provided earlier by offline configuration document 138 and transferred to download page 230 element 232, which is the downloaded instance of offline configuration document 138. This information specifies the services 126 are needed to support this application. The .inf files are brought down first, compared against local files (if any), and if an update or a new install is required, then additional requests made over interface 309 result in download the large .exe files (called the file sets, meaning sets of files that are compressed.) The .inf files are checked against local the local versions, enabling client 200 to avoid having to download anything big over line 309, which in today's technology may be a slower, network connection. In addition, a CD delivery mechanism may be provided, by which .exe files and .inf files may be brought to the client machine.

III.C.3 Set Up File Sets

Referring to FIG. 9 and FIG. 10, during stage 3, service file sets are uncompressed and initialized. These steps are executed by download control 234 as local processing on client machine 200, no network traffic over interface 300 being involved. During this stage 3, elements on client side 200 are created, including those represented by elements 204, 208 and 210, 212, 214, and 216. Subscription user ID 206 is the end product of the interface 307 request, and is stored during stage 3 in<name space> directory of element 204.

pdir program directory 208 on client receives the uncompressed DLLs. That is, local names.nsf 212, local mail.box 214, password.db 216 databases and local services ID 210 are stored in<Data> directory 208. These are data files generically useful to any subscription that runs offline. All these are uncompacted and configured during stage 3.

Local services ID 210 is generated dynamically so it is unique to every client machine 200 having an encryption key from locale 128. This key is used to encrypt password database 216 for all future storage of user passwords.

Stage 3 continues by installing in the program director <pdir> of 208 service manager 218, synchronization task 220, HTTP 222, index 224, agent 226, and custom 228. Additionally, local names.nsf 212 is configured with connection information for future Notes protocol requests to connect to the server. At this time, subscription 202 (including access control list (ACL) 203) does not yet exist, and is the one thing in client 200 not set up by end of stage 3.

III.C.4 Populate Client Subscription

Referring to FIGS. 7–10, stage 4 executes to populate subscription 202, which comprises local duplicates either in full or in subset of databases 140, 142 and 144. Stage 4 thus brings down subscription data 136, including subscription main database 140, required databases 142 and optional databases 144 unique to this particular experience on this web server 100. This is the content and logic of the web application. All these database will have an access control list (ACL) object attached to them.

Stage 4 activates service manager 218 and synchronization task 220 on client machine 200. Manager 218 monitors progress and reports to user. Sync task 220 executes first time replication. It makes an access to 206 and makes a protocol request 313 using Notes RPC as the protocol (not HTTP), requesting of server 104 that it replicate and to ship down interface 313 the subscription 140, 142, 144 database main, required, and optional that are flagged.

Stage 4, if installing a subset of databases 140, 142, and 144, initially filters subscription user ID 206 against ACLs 167, 169 and 168 on server copies of databases 140, 142, and 144. Such ACLs exist at database level and also on subelements inside of databases. This is in accord with Notes RPC protocol. Only those server 100 elements having ACLs to which user 206 is authorized access are accessible and may be downloaded. The ACLs of those elements which are downloaded are replicated in the local client 100 versions for continued assurance that information in local copies is properly security restricted.

At the end of stage 4, optional processing occurs on subscription 202, as determined by configuration settings initially established in stage 1 from configuration document 138, the client side rendition of which is configuration document 232. Example: if full text index services were required and downloaded, they would be activated now upon the subscription at the end of stage 4. If there were custom services 228, they would be activated at this time as well. When stage 4 is complete, download control 234 announces successful completion.

Subscription links desktop 252, start menu 256 and driver tray 258 were installed in stage 3. Uninstall 246 was made in stage 2.

III.D. CD Distribution

Referring to FIG. 3, server 60 is provided with a Domino On Line Services (DOLS) module which loads compressed ZIP files and client DLLs comprising a subscription to a client machine as client local replicas 74 characterized by a logic model, data model and security model providing to the user an offline web site which may be kept in synchronization with server 60. Alternatively, various combinations of compressed ZIP files and client DLLs may be loaded to a client services install CD 72, which in turn may be loaded to the client machine.

Referring further to FIG. 3, an API for Lotus Notes is provided. In accordance with an exemplary embodiment of the invention, Notes program DLLs, or databases containing dynamic linked libraries, are rendered available to function across non-Notes user interfaces. This is accomplished by, for example, loading an application onto a user's machine from a client services install CD 72 onto which is packed the experience of a web site as a local run time model 90, including logic model 76 comprising Notes DLLs (compressed ZIP files), data model 78, comprising nsf and .ntf files, and security model 80, comprising ID security based on the ACFs applied to all databases replicated to the client.

In accordance with level 82, an alternative distribution system for these DLLs is to create a level 82 client services install CD 82. These compressed ZIP files, comprising iNotes compressed, include compressed DLLs 70 and iNotes Sync manager, or service manager 218. Such a CD 72 installation serves the purpose of speeding up installation time on clients which would otherwise have to download this material over a low speed data transmission line. Then, at the first access to the host server, DOLS does not need to download the DLLs (which are very large), and can skip to steps bringing down IDs, security information, and data to complete the set up of a local web site.

In accordance with level 84, CD 72 is loaded with a copy of the entire web site, that is, the NSF databases comprising the web site with programs executable on the client machine without having to access the server, but including an invitation to do so. When the customer finally does access the server, data files may be replicated and synchronized, and the web site owner has registered this client as a customer.

In accordance with level 86, CD 72 is loaded with the Notes API program, which includes customer data, and the NSF's for iNotes installation. Notes API refers to run time file sets that support execution of Notes API programs. In the exemplary embodiment of FIG. 9, these are represented by custom file sets 228 and also by file sets 218, 220, 222, 224, 226. It is an important aspect of this embodiment of the invention that customer data is brought a run time that executes on the client machine the same as it executes on the server—this is the same result whether downloaded from the web or pre-packed on a CD. The customer is thus provided a high degree of guarantee that the logic is executable, that the data is still editable, with the same behavior and same access rights experienced when accessing a host based subscription. The customer is provided a personal copy of the Web site that is fully functional.

In this way a fully interactable web site is provided to a user who, after trying out the application on a client machine without accessing the host server, may be teased into registering to the web server.

With respect to security, this is meaningful primarily in terms of "Is the user being distinguished from other users?" This is generally only meaningful in the context of a connection to a server. Consequently, when distributing a CD, security is set up when the first user logs into a server account. Thereafter, or when installed initially from the web site, the client replica of the web site includes fully functional logic, data, and security models.

While web site distribution via CD has been described, other distribution media may be used, such as removable hard drives, ZIP disks, or prepackaged on the drives of new computers or lap top.

An unbundling of values to a local run time model may be executed as follows: (1) installing and distributing to a customer at a client site a CD that includes (a) the iNotes run time, (b) a Notes API program, (c) a program (in any language) which uses Notes API calls to store and retrieve data to a Notes database, (d) a standalone customer program which includes an invitation to connect to a web site; and (2) responsive the customer accepting the invitation, executing the replication model.

A local, or client, application, may be downloaded from server 60 under control of DOLS 62, as previously described in connection with FIGS. 7–10, or via a client services CD to which the client DLLs and compressed ZIP fils 70 have been loaded. When loaded from a CD or other such distribution medium, client 74 need never communicate with the server 60. On the other hand, it may. In accordance with an important aspect of the invention, a third party business partner, for example, may write a stand-alone application, such as a virus checker, that has nothing to do with Notes but uses nsf databases as a data store and the Lotus indexing model to maintain third party local data. In this way, the stand-along application is rendered capable of registering to the Lotus web site, which is powered by a Domino server 60, in order to update data 78 to the most recent version. Once registered, the user may replicate upward for centralized management, and once connected obtain the full benefits of the security model.

In this way, a run time is brought to the customer's data that is the same run time that executes on a server, giving the customer a high degree of confidence that the logic is executable, that data is still editable, all with the same behavior and same access rights. Yet, such an application need never have communicated with the server, it may remain entirely client centered.

III.E. End User

The end user opens a Domino Web application that the Web site developer and administrator have enabled for offline use. In the initial screen of the Web application, the user clicks a Web control that contains the words, "Go offline." A pop-up menu appears giving the user the option of installing the Web application as a subscription on the local machine (client). A subscription includes the Domino Web application, its related databases, and subscription property settings.

If this is the first time an end user is installing a subscription, the Lotus iNotes Sync Manager utility is downloaded to the user's machine. Files needed for working offline in a secure environment and for managing synchronization are also downloaded. The installation is seamless and nearly invisible to the end user. If download time is an issue, the end user can also use a CD to install Lotus iNotes Sync Manager. If the end user already has a Notes ID, that ID can be used; if not, a new ID can be generated.

Once the download finishes, Lotus iNotes Sync Manager opens automatically on the user's machine. Lotus iNotes Sync Manager is integrated into the Windows desktop and lets the user manage multiple offline subscriptions. The tasks users can perform using Lotus iNotes Sync Manager include:

Opening the application offline to make changes to it

Opening the online Web application.

Setting standard synchronization settings.

Synchronizing the online and offline versions of the application with each other.

Referring to FIGS. 9–10 and 14–15, an end user experiences service manager 218 and application page 238. The end user experience may also utilize application page 238 in an offline mode as is represented by line 319. When changes have occurred in that offline mode, the user may cause periodic synchronization between online/offline versions of subscription 136 and 202 to take place through scheduled or direct commands available from the interfaces presented by web control 241 or service manager 218. The ability to work with private subscription copy 202 reduces load on server 100, takes advantage of processing speeds and access speed of local processing by executing solely on client platform 200, and minimizes the degree of information that must traverse across interface 300 between clients 200 and server 100.

III.E.2 Service Manager Tasks

From service manager 218, a user can:

View subscriptions offline and online

Synchronize any changes between the Domino Web application and the offline application Choose synchronization settings from the Sync Options tab of the Subscription Properties box Stop active synchronizations Remove installed offline subscriptions from the local machine To launch Service manager 218, a user double-clicks, for example, a Lotus iNotes icon on the Windows desktop or chooses Service manager 218 from the Start menu (Start-Programs-Lotus iNotes Sync Manager-Lotus iNotes Sync Manager).

Each time a user creates a subscription by accessing an offline-enabled Web application and clicking a Web Control or icon, the subscription is listed in subscription window 263 of Service manager 218. In addition, a shortcut to that subscription may be created on the desktop. To launch a subscription 202 offline in a browser 244, the user clicks the icon for the offline subscription on the desktop. This opens the Service manager 218 and then opens the application in the offline browser 244.

By default, Service manager 218 runs all the time, often in the background. If the user exits from the Service manager 218, scheduled synchronizations do not occur until it is restarted. The user can also disable Auto-start.

III.E.2.a HTTP

Referring to FIGS. 9 and 10, during the end-user scenario, once subscription 202 has been downloaded and service manager 218 installed, the user may launch service manager 218 to present a trivial interface 270 for managing the services and subscriptions that are available offline, as is more fully described above with reference to FIG. 14. The user interface that service manager 218 presents is a simple list of subscriptions 281 with options to trigger synchronization, alter sync properties such as scheduled unattended replication and synchronization, and limit the size of or delete subscriptions.

The properties of an individual subscription that a user may edit are those which were preset by an administrator when editing offline configuration document 138.

Service manager 218 typically will start up with each reboot of client machine 200, and is always running so that it can execute scheduled synchronization in the background. It also allows the end user to open a web browser 244 to the on-line or off-line version of subscription 202, 136. If user visits on-line version 136, service manager 218 launches browser 244 with the appropriate URL to cause browser to load application page 238 from source subscription main database 140 through protocol connection 317.

III.E.2.b Application Page

Within application page 238 there may be a rendering of status JScript 240 and time zone JScript 242, client side renderings established during the design scenario of status JScript 132 and/or time zone JScript 134. The design scenario may include enhancements to cause application page 238 to conditionally display useful information or tools in both online and offline contexts.

The rest of the application page 238 executes when loaded from interface 317 with full functionality known from Domino web server platform 100, as rendered specifically through HTTP service 106. It is a unique proposition of DOLS that when rendered from source 319, the architecture of client configuration is such that application page 238 is as fully functional as when from source 317. Source 319 therefore has the same protocol and security attributes as source 317, with one exception: the use of secure sockets SSL is disabled as unnecessary when making connections to a process that resides on the same machine.

III.E.2.c Synchronize/Concurrent Replication

The web synchronization control 241 provides a convenience interface to the commands normally available (subset of commands) from service manager 218. It allows the user to select and see a pop up menu with options to synchronize now, go online or go offline, and install subscription and subscription properties. Selecting install brings up a service manager user interface for extended alteration of properties for subscriptions. An install subscription option is a special convenience link to cause display of download page 230 for either first time install or reinstalls, and designers may choose to display this link as the way for users to get to download page 230.

While service manager 218 is running, it maintains schedules for all subscriptions 202 which user has taken offline, which can be from multiple servers 104 and from multiple user identities 206, each with separate database groupings and synchronization rules and properties. Each subscription 202 has a users name (ID) and password from 216 closely associated with it as well as the server source 104 from which the subscription has been taken. User names and passwords are in 216, which is encrypted with an encryption key taken from 210 local services ID.

Service manager 218 presents an interface for setting a password on the local services ID 210. The act of setting that password effectively password protects password database 216, requiring the end user at browser 244 to provide that password to service manager 218 every time it starts before it can access database 216. This protects passwords which must be utilized by synchronization task 220 when executing scheduled or on demand replication initiated through service manager 218 on behalf of the end user. When synchronization task 220 runs, it retrieves user name and password from database 216 appropriate to the subscription 202 at hand and uses those credentials along with subscription user ID 206 to satisfy and create a Notes remote procedure call (RPC) to initiate a protocol connection via line 313 as was previously described with respect to first time download setup.

In accordance with a preferred embodiment of the invention, simultaneous or concurrent replication is provided. Simultaneous replication is provided first with respect to a plurality of databases, and second with respect to a plurality of user ID's.

When replicating to a plurality of databases on a single CPU client from a plurality of servers on different hosts, in accordance with a preferred embodiment of the invention, concurrent replication is provided. The CPU will, in this case, perform preemptive multitasking, allocating CPU cycles to whichever replication process is not waiting on input.

Simultaneous replication of a plurality of subscriptions makes sense to do when the user triggers them all on demand, or their schedules all come due at the same time.

Simultaneous replication may be executed with respect to two subscriptions, but serially with respect to the nsf databases within a given subscription. This model, of serial replication of databases within a single subscription, makes sense when dealing with a single server CPU, but may not when dealing with a multi-processor at the server side.

A user may exercise the option to store passwords and schedule replication to occur unattended, for example, at 2:00 a.m. when dial-up charges are relatively low. If a password is stored, it is stored in password database 336 for use during replication without prompting the user for its entry. Otherwise, replication will not proceed until the user enters the password.

Referring further to FIG. 11, a third party has at server 100 a subscription 334 protected by a password 348 also stored in password database 336. In accordance with an exemplary embodiment of the invention, the manner in which the first user (the user who owns passwords 340, 342 and 344) accesses subscription 334 is as follows.

Consider the situation where, for example, the first user (a manager) is entitled to assume the role of the second user (an employee), and the first user desires to verify that the second user does not have access by way of subscription 334 to, for example, manager data which is tightly stored in the NSFs of subscription 330. However, in this situation, subscription 334 may include some a database common to subscription 330 but including different data documents.

In accordance with this exemplary embodiment of the invention, the first user may (provided he can enter the user name and password of the second user) take the second user's subscription offline to client 200 where it will be filtered by the second user's identity rather than that of the first user. Now, client 200 has replicated copies of subscriptions 330 and 334, which may provide different views of the same data, but which, because of filtering by different identities, will not be cross contaminated. In this case, filtering by different identities is finely grained filtering of data according to roles and levels, rather than at the document and directory level as in other applications.

If not filtered by different identities, but rather at the document or directory level, the situation would be as follows. The first user has at client 200 a local replica of subscription 330, replicated using user ID and password 342. He then switches to ID and password 348 to assume the role of the second user (assuming he is entitled to do so because of, say, a manager/employee relationship), and downloads a replica of subscription 334. In this example, because the data files in the local replica of subscription 330 at client 200 are not filtered by user ID and password 342, data files in subscription 330 common to subscriptions 330 and 334 would be contaminated by being brought into synchronization with the data files of subscription 334 (documents in a subscription 330 database being deleted by not being present in the corresponding subscription 334 database).

This operation is also distinguished from a replication model in which filtering is done at the file or directory level. In this case, in order to replicate to a second subscription, the user first unloads a first subscription from his client machine, and then replicates down the second subscription. This model does not support concurrent, unattended replication of a plurality of subscriptions. That is, at 2:00 a.m., only one subscription would replicate. In order to replicate a plurality of subscriptions, the user would have to wake up and enter a second user ID and password to start replication of the second subscription. In this scenario, only one subscription could be put on an automated replication schedule at a time.

III.E.2.d Indexing

The other tasks managed by service manager 218, including index 224, agent 226, and custom 228 are activated by the service manager 218 according to events or schedules appropriate for the service. Index service 224 ensures that views and full text indexes utilized by subscriptions 136 are kept up to date in the offline subscription 202. Users experience those indexes as part of application pages 238 when rendered by off line HTTP service 222, but HTTP service 222 does not ensure views or indexes are kept up to date.

III.E.2.e Agent

Agent 226 task executes Lotus Script agents either on schedule or event, extending the processing associated with application page 238 to have customizable Notes Domino workflow. These services 222, 224, are 226 are the same services utilized by platform 100, hence the name Domino Offline Services (DOLS).

III.E.2.f Custom

Custom services 228 represents services that a third party may create as augmentations to the web application 238 that execute in an offline context. These provide either duplicate processing for customization found in platform 100 or specialized augmentation unique to offline usage reserved only to client 200. A third party can extend server 100 and not client 200, extend client 200 and not server 100, or have both client and server the same.

An example of custom services 228 is a MAPI messaging API, which is an industry standard protocol for mail applications. Another example would let Microsoft Outlook (TM) open Notes Domino mail subscriptions. Where HTTP task 222 converts Domino and NSF information to and from HTML, a custom MAPI component 228 may be provided for conversions to and from MAPI standard exchange formats. It is a foundational premise of custom services 228 that other extension formats to allow NSF information to render in arbitrary other user interfaces and products. In this respect, API programs that utilize the Notes API now can utilize the offline services as a runtime for Notes Domino programs.

In accordance with a further embodiment of the invention, in order to take advantage of an unbundled run time, it is necessary to provide a method for downloading an API program to a user's desktop.

Three methods for so doing have been described with reference to FIG. 4 by use of a CD distribution media.

Another approach is to execute custom code install from the server to the client. This involves the creation of a permission moment, a moment in which the user is prompted to respond to two queries: (1) site identity: does the user believe that the server is who it represents itself to be; and (2) site trust: does the user trust the server to place the custom code on the client machine.

Figure 26:
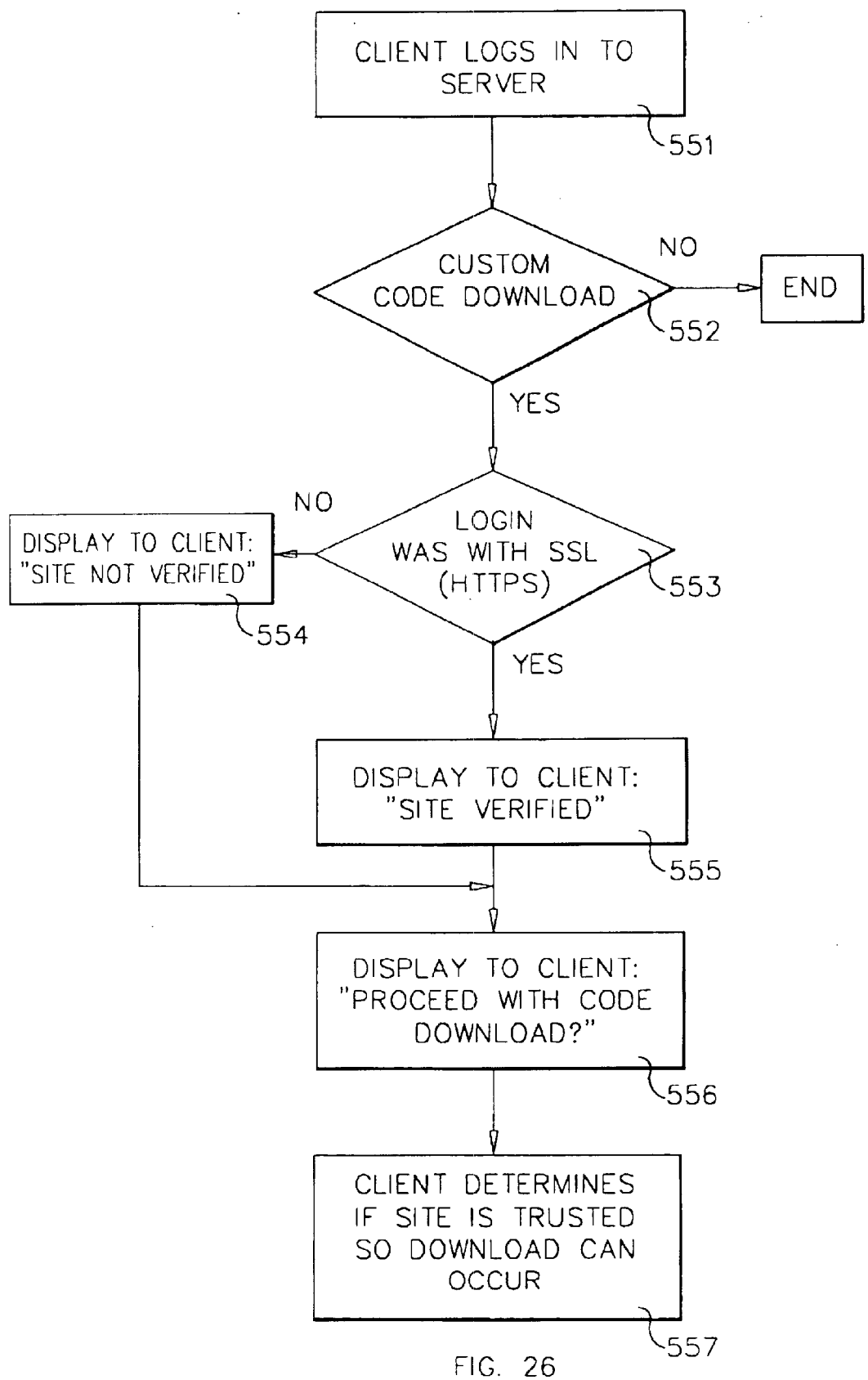
FIG. 26 is a flow diagram illustrating site verification for custom code download.

Referring to FIG. 26, in accordance with the preferred embodiment of the invention, site identity is associated with the secure sockets (SSL) signature, and whether the connection to the web site has been made using HTTPS (secure) or HTTP (not secure). If in step 553 it is determined that the user has connected to the server web site in step 551 using SSL, then the site identity and site trust queries are presented by stating (1) in step 555, the site has been verified as being what it represents itself to be, and (2) in step 556, asking "Do you trust the web site to download custom code to your client machine? If the user has not connected to the server web site using SSL, then the site identity and site trust queries are presented by stating (1) in step 554, the site has not been verified as being what it represents itself to be, and (2) again in step 556, asking do you trust the web site to download custom code to your client machine?

Download of the custom code proceeds based upon the user determination in step 557 that the web site, whether verified or not, is to be trusted. The advantage in this approach is with respect to accountability, and a direct chain is provided for determining fault if the download code is inappropriate or faulty.

In accordance with a further embodiment of the invention, custom download is incrementally performed, with pieces, such as a subset or a feature, downloaded as it is needed.

Recapping, by way of a high level overview, during the server administration experience, the system administrator creates policy documents; during the web site developer experience, design inclusions 116, NTF samples 115, and status JScript 132 design elements are brought into main database 140; during the download experience, subscription 136 is downloaded to subscription 202; during the end user experience, the end user interfaces with application page 238.

Advantages over the Prior Art

It is an advantage of the invention that there is provided a system and method for enhancing a workflow, enterprise, and mail-enabled application server and platform to support distributed computing and remote execution of we b applications.

It is a further advantage of the invention that there is provided a system and method for enhancing a workflow, enterprise and mail-enabled web application to allow distributed computing and remote execution of creation of collaborative user communities.

It is a further advantage of the invention that there is provided an improved system and method for issuing user identifiers (IDs).

It is a further advantage of the invention that there is provided a system and method for issuing user IDs which enables an administrator selectively to generate an ID, reuse a previously issued ID, or prompt a user for an ID.

It is a further advantage of the invention that there is provided a system and method for a plurality of ID distribution models, including those where a user ID is available in a name and address book or on a users file system.

It is a further advantage of the invention that there is provided a system and method for selective generate or lookup of ID's for a new infrastructure based upon the existence or non-existence of an infrastructure with appropriate ID's already deployed.

Alternative Embodiments

It will be appreciated that, although specific embodiments of the invention have been described herein for purposes of illustration, various modifications may be made without departing from the spirit and scope of the invention. In particular, it is within the scope of the invention to provide a computer program product or program element, or a program storage or memory device such as a solid or fluid transmission medium, magnetic or optical wire, tape or disc, or the like, for storing signals readable by a machine, for controlling the operation of a computer according to the method of the invention and/or to structure its components in accordance with the system of the invention.

Further, each step of the method may be executed on any general computer, such as an IBM System 390, AS/400, PC or the like and pursuant to one or more, or a part of one or more, program elements, modules or objects generated from any programming language, such as C++, Java, P1/91, Fortran or the like. And still further, each said step, or a file or object or the like implementing each said step, may be executed by special purpose hardware or a circuit module designed for that purpose.

Accordingly, the scope of protection of this invention is limited only by the following claims and their equivalents.

We claim:

1. A system for managing concurrent scheduled or on-demand replication of subscriptions f or different user credentials within a workflow, enterprise and mail-enabled web application server and platform, comprising:
   a database for storing user passwords;
   a plurality of subscriptions, each identified by a subscription user credential including password, user name and authenticatable electronic certificate, said subscription providing a logical grouping of data defining a subset of data to be replicated, application implementations, and application-instance security context including roles that said application implementation responds to differently and access control and distribution rules for said subset of data;
   a service manager for executing concurrent replication of a plurality of said subscriptions on schedule or demand in accordance with said distribution rules for which a password corresponding to said subscription credential for said subset of data has been provided by a user or found in said database; and
   said service manager replicating to a user browser an offline subscription corresponding to one of said plurality of subscriptions and containing client-side runtime and framework for a fully functioning offline server.

2. A system for managing concurrent replication of subscriptions within a workflow, enterprise and mail-enabled web application server and platform, comprising:
   a plurality of web-enabled, offline subscriptions each identified by user credentials including user identifier and subscription password, said subscription providing a logical grouping of data defining a subset of data to be replicated, application implementations, and application-instance security context;
   a service manager for displaying to a user a plurality of said subscriptions, for enabling user selection of replication parameters for each said subscription, for maintaining replication schedules for said subscriptions, and for replicating to a user browser an offline subscription corresponding to one of said plurality of subscriptions and containing client-side runtime and framework for a fully functioning offline server; and
   a utility responsive to user input for concurrently replicating on schedule or demand in accordance with said distribution rules a subscription corresponding to one of said plurality of subscriptions and for which said user has entered a user password matching said subscription password.

3. The system of claim 2, said service manager further displaying disk space usage for enabling user limitation of usage or removal of said subscription.

4. The system of claim 2, wherein said plurality of web enabled, offline subscriptions are from multiple servers and from multiple user identities, and selectively having separate database groupings and synchronization rules and properties.

5. The system of claim 2, further comprising
   a user password database for optionally storing said user password for each of said plurality of subscriptions; and
   said utility being selectively responsive to a matching user password in said password database for replicating a corresponding subscription and responsive to no matching user password in said password database for prompting for user input of said user password before replicating said corresponding subscription.

6. A method for managing concurrent replication of subscriptions within a workflow, enterprise and mail-enabled web application server and platform, comprising the steps of:
   storing user passwords in a password database;
   associating a subscription password with each of a plurality of subscriptions, each said subscription containing a logical grouping of data defining a subset of data to be replicated, application implementations, and application-instance security context for providing a client-side runtime and framework for a fully functioning offline server for offline operation of a client browser;
   executing concurrent replication of a plurality of said subscriptions on schedule or demand in accordance with said distribution rules for which a password corresponding to said subscription password has been provided by a user or found in said database.

7. A program storage device readable by a machine, tangibly embodying a program of instructions executable by a machine to perform method steps for managing concurrent replication of subscriptions within a workflow, enterprise and mail-enabled web application server and platform, said method steps comprising:

storing user passwords in a password database;

a associating a subscription password with each of a plurality of subscriptions, said subscription providing a logical grouping of data defining a subset of data to be replicated, application implementations, and application-instance security context;

executing concurrent replication of a plurality of said subscriptions on schedule or demand in accordance with said distribution rules for which a password corresponding to said subscription password has been provided by a user or found in said database, each said subscription containing client-side runtime and framework for a fully functioning offline server for offline operation of a client browser.

8. A system for issuing user identifiers for subscriptions in a workflow, enterprise and mail-enabled application server and platform, comprising:

a database of security domains;

system electronic certificates for authenticating user credentials;

each said subscription containing client-side runtime and framework for a fully functioning offline server for offline operation of a client browser by providing a logical grouping of data defining a subset of data to be replicated, application implementations, and application-instance security context; and a tool responsive to said database and said certificates for distributing user identifiers selectively based upon security domain through auto generation, directory lookup or user prompt.

9. The system of claim 8, further comprising:

an identifier repository database;

a security domain document in said database of security d oma ins for use in locating in said identifier repository database a user identifier selected for distribution based upon directory lookup.

10. The system of claim 8, further comprising:

a security domain document from said database of security domains for specifying an electronic certificate for use in auto generating a user identifier selected for distribution based upon auto generation.

11. The system of claim 8, further comprising:

prompt code for execution in response to a need for a user entered user identifier.

12. The system of claim 8, further comprising:

a security model for enabling the distribution of previously deployed user identifiers by table lookup.

13. The system of claim 9, further comprising:

prompt code for execution in response to a need for a user entered user identifier; and a security model for enabling the distribution of previously deployed user identifiers by table lookup.

14. A method for issuing user identifiers for subscriptions in a workflow, enterprise and mail-enabled application server and platform, comprising the steps of:

providing a database of security domains;

responsive to said database, distributing user identifiers selectively based upon security domain through auto generation, directory lookup or user prompt; and each said subscription providing a logical grouping of data defining a subset of data to be replicated, application implementations, and application-instance security context containing client-side runtime and framework for a fully functioning offline server for offline operation of a client browser.

15. The method of claim 14, further comprising the steps of:

providing an identifier repository database of user identifiers;

locating a security domain document in said database of security domains for accessing in said identifier repository database a user identifier select ed for distribution based upon directory lookup.

16. The method of claim 14, further comprising the step of:

locating a security domain document in said database of security domains for specifying an electronic certificate for use in auto generating a user identifier selected for distribution based upon auto generation.

17. The method of claim 14, further comprising the step of:

executing user prompt code response to a need for a user entered user identifier.

18. The method of claim 14, further comprising the step of:

responsive to a security model, distributing previously deployed user identifiers by table lookup.

19. The method of claim 14, further comprising the steps of:

executing prompt code in response to a need for a user entered user identifier; and responsive to a security model, enabling the distribution of previously deployed user identifiers by table lookup.

20. A program storage device readable by a machine, tangibly embodying a program of instructions executable by a machine to perform method steps for issuing user identifiers for subscriptions in a workflow, enterprise and mail-enabled application server and platform, said method steps comprising:

providing a database of security domains; and responsive to said database, distributing user identifiers for subscription containing client-side runtime and framework for a fully functioning offline server for offline operation of a client browser selectively based upon security domain through auto generation, directory lookup or user prompt, said subscription providing a logical grouping of data defining a subset of data to be replicated, application implementations, and application-instance security context.

21. A computer program product configured to be operable for managing concurrent scheduled or on-demand replication of subscriptions for different user credentials within a workflow, enterprise and mail-enabled web application server and platform, according to the steps of:

storing user passwords in a password database;

associating a subscription password with each of a plurality of subscriptions; each said subscription containing a logical grouping of data defining a subset of data to be replicated, application implementations, and application-instance security context for providing a client-side runtime and framework for a fully functioning offline server f or offline operation of a client browser;

executing concurrent replication of a plurality of said subscriptions on schedule or demand in accord ance with said distribution rules for which a password corresponding to said subscription password has been provided by a user or found in said database.

22. A computer program product configured to be operable for issuing user identifiers for subscriptions in a workflow, enterprise and mail-enabled application server and platform, according to the steps of:

providing a database of security domains;

each said subscription containing a logical grouping of data defining a subset of said database to be replicated, application implementations, and application-instance security context for providing a client-side runtime and framework for a fully functioning offline server for offline operation of a client browser; and responsive to said database, distributing user identifiers selectively based upon security domain through auto generation, directory lookup or user prompt.

* * * * *